(12) United States Patent
Takeda

(10) Patent No.: US 9,883,061 B2
(45) Date of Patent: Jan. 30, 2018

(54) IMAGE READING DEVICE AND IMAGE READING AND FORMING APPARATUS

(71) Applicant: Oki Data Corporation, Tokyo (JP)

(72) Inventor: Taishi Takeda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/243,464

(22) Filed: Aug. 22, 2016

(65) Prior Publication Data

US 2017/0064110 A1 Mar. 2, 2017

(30) Foreign Application Priority Data

Aug. 31, 2015 (JP) ................................. 2015-170882

(51) Int. Cl.
*H04N 1/04* (2006.01)
*H04N 1/00* (2006.01)
*H04N 1/10* (2006.01)

(52) U.S. Cl.
CPC ..... *H04N 1/00549* (2013.01); *H04N 1/00557* (2013.01); *H04N 1/1039* (2013.01); *H04N 1/1065* (2013.01); *H04N 2201/0081* (2013.01); *H04N 2201/0094* (2013.01)

(58) Field of Classification Search
CPC .. B65B 43/42; B65B 7/2892; H04N 1/00549; H04N 1/00557; H04N 1/1039; H04N 1/1065; H04N 2201/0081; H04N 2201/0094; H04N 5/64
USPC .......... 600/37, 204, 208, 215, 223; 271/225; 399/262, 331; 358/474, 496, 497
See application file for complete search history.

(56) References Cited

U.S. PATENT DOCUMENTS

| | | | | |
|---|---|---|---|---|
| 4,862,218 A * | 8/1989 | Tsunoda | ............... | G03B 27/527 355/39 |
| 7,646,515 B2 * | 1/2010 | Ichinose | ............ | H04N 1/00909 358/471 |
| 8,167,400 B2 * | 5/2012 | Iriguchi | ................... | B41J 2/165 347/19 |
| 8,462,398 B2 * | 6/2013 | Otsuki | ............... | H04N 1/00559 358/474 |
| 8,861,049 B2 * | 10/2014 | Takahashi | .............. | H04N 1/121 358/303 |

(Continued)

FOREIGN PATENT DOCUMENTS

JP 2014-003396 A 1/2014

*Primary Examiner* — Negussie Worku
(74) *Attorney, Agent, or Firm* — Muncy, Geissler, Olds & Lowe, P.C.

(57) ABSTRACT

An image reading device includes first and second image reading platforms that are separated from each other with a separation member, an image reading element movable between positions facing the first and second image reading platforms, a pair of sliding members that is slideable in a direction according to the movement of the image reading element on a pair of sliding paths that extends in the direction and is disposed so as to be spaced apart from each other in another direction intersecting with the direction and that is provided so as to at least partially overlap with the first and second image reading platforms; and a pair of protrusions disposed on parts of the pair of sliding paths positioned on both sides of the separation member in the another direction and that protrudes further toward the pair of sliding members from the first and second image reading platforms.

10 Claims, 13 Drawing Sheets

(56) References Cited

U.S. PATENT DOCUMENTS

| | | | |
|---|---|---|---|
| 8,964,266 B2* | 2/2015 | Yamasaki | H04N 1/1039 |
| | | | 358/474 |
| 9,348,251 B2* | 5/2016 | Sumikura | G03G 15/04 |
| 9,363,399 B2* | 6/2016 | Mabara | H04N 1/00745 |
| 9,413,909 B2* | 8/2016 | Kim | H04N 1/00557 |
| 2005/0094220 A1* | 5/2005 | Lin | H04N 1/1017 |
| | | | 358/474 |
| 2017/0064110 A1* | 3/2017 | Takeda | H04N 1/00549 |
| 2017/0208208 A1* | 7/2017 | Fujii | H04N 1/3878 |
| 2017/0264772 A1* | 9/2017 | Takahashi | H04N 1/1065 |

* cited by examiner

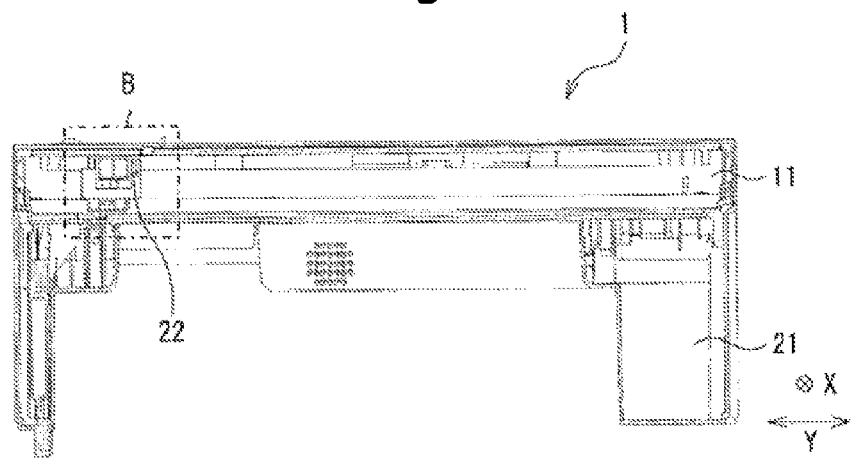
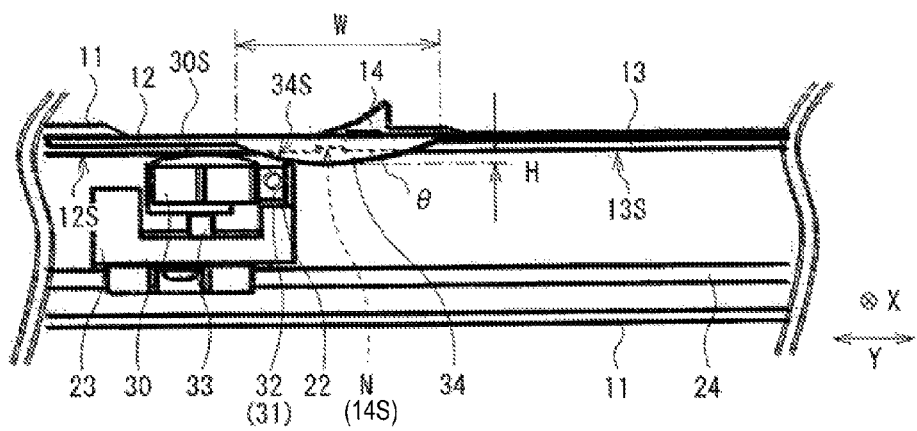

IMAGE READING DEVICE AND IMAGE READING AND FORMING APPARATUS

CROSS REFERENCE TO RELATED APPLICATIONS

This application claims priority under 35 USC 119 to Japanese Patent Application No. 2015-170882 filed on Aug. 31, 2015, the entire contents which are incorporated herein by reference.

TECHNICAL FIELD

This invention relates to an image reading device that reads an image and an image reading and forming apparatus provided with the image reading device.

BACKGROUND

An image reading and forming apparatus represented by a multifunction machine or the like having an electrophotographic image forming function is provided with an image reading device that reads an image, and an image forming apparatus that forms the image read by the image reading device on the surface of a medium.

This image reading device mainly includes two image reading platforms used for reading an image and an image reading element that reads the image.

The two image reading platforms are separated from each other. The one image reading platform is used for reading the image of a manuscript placed on that one image reading platform. The other image reading platform is used for reading the image of a manuscript carried onto the other image reading platform using an automatic carrying mechanism such as a feeder.

The image reading element can move between a position facing the one image reading platform and a position facing the other image reading platform. That is, when the one image reading platform is used for reading an image, the image reading element moves to the position facing that one image reading platform. When the other image reading platform is used for reading an image, the image reading element moves to the position facing that other image reading platform.

Concerning the configuration of this image reading device, various investigations have been already made. Specifically, when moving a scanner unit where sliding members are provided, in order to suppress the vibration of that scanner unit, the sliding members are let slide by utilizing a bridge part integrated with a housing (for example, see Patent Document 1). This housing supports a first glass plate and a second glass plate.

RELATED ART

[Patent Document] Japanese Laid-Open Patent Publication 2014-003396

If the image reading element vibrates while moving, the image reading performance by that image reading element easily deteriorates. Therefore, the vibration of the image reading element should desirably be suppressed as much as possible. However, in spite of the fact that various measures have been investigated to suppress the vibration of the image reading element, the measures are not sufficient yet, having some room for improvement.

This invention was made considering such a problem, and its objective is to offer an image reading device and an image reading and forming apparatus that allow an excellent image reading performance to be obtained.

SUMMARY

An image reading device disclosed in the application comprises: a first image reading platform and a second image reading platform arranged in a first direction and separated from each other with a separation member; an image reading element that is movable between a position facing the first image reading platform and a position facing the second image reading platform; a pair of sliding members that is slideable in the first direction according to the movement of the image reading element on a pair of sliding paths that extends in the first direction and is disposed so as to be spaced apart from each other in a second direction intersecting with the first direction and that is provided so as to at least partially overlap with the first image reading platform and the second image reading platform; and at least a pair of protrusions that is disposed on parts of the pair of sliding paths positioned on both sides of the separation member in the second direction and that protrudes further toward the pair of sliding members from the first image reading platform and the second image reading platform.

An image reading and forming apparatus disclosed in the application comprises: an image reading device that reads an image, and an image forming apparatus that forms an image based on the image read by the image reading device. The image reading device includes the above discussed features.

According to an image reading device or an image reading and forming apparatus of an embodiment of this invention, a first image reading platform and a second image reading platform are separated from each other via a separation member. According to the movement of an image reading element, a pair of sliding members can slide on a pair of sliding paths overlapping partially with the first image reading platform and the second image reading platform. Provided on at least part of the pair of sliding paths positioned on both sides of the separation member is a pair of protrusions protruding more toward the pair of sliding members than the first image reading platform and the second image reading platform. Thereby, an excellent image reading performance can be obtained.

BRIEF DESCRIPTION OF THE DRAWINGS

FIG. 8 is a cross-sectional view showing the configuration along a line A-A of the image reading part shown in FIG. 2.

FIG. 9 is a cross-sectional view showing enlarged part (part B) of the configuration of the image reading part shown in FIG. 8.

DETAILED DESCRIPTION OF THE EMBODIMENT(S)

Below, an embodiment of this invention is explained in detail referring to drawings. Note that the order of explanations is as follows.
1. Configuration of the image reading and forming apparatus
   1-1. Overall configuration
   1-2. Configuration of the image reading device
   1-3. Configuration of the image forming apparatus
2. Operations of the image reading and forming apparatus
   2-1. Operations of the image reading device
   2-2. Operations of the image forming apparatus
3. Action and effect of the image reading and forming apparatus
   3-1. Action and effect of this invention
   3-2. Comparison between this invention and the reference example
4. Modification <1. Configuration of the Image Reading and Forming Apparatus>

First, explained is the configuration of an image reading and forming apparatus of an embodiment of this invention.

The image reading and forming apparatus explained here has both an image reading function and an image forming function, and an example is a multifunction machine having an electrophotographic image forming function or the like.

Note that because the image reading device of an embodiment of this invention is a part of the image reading and forming apparatus explained here, the image reading device and the image reading and forming apparatus are explained together below.

<1-1. Overall Configuration>

Figure 1:
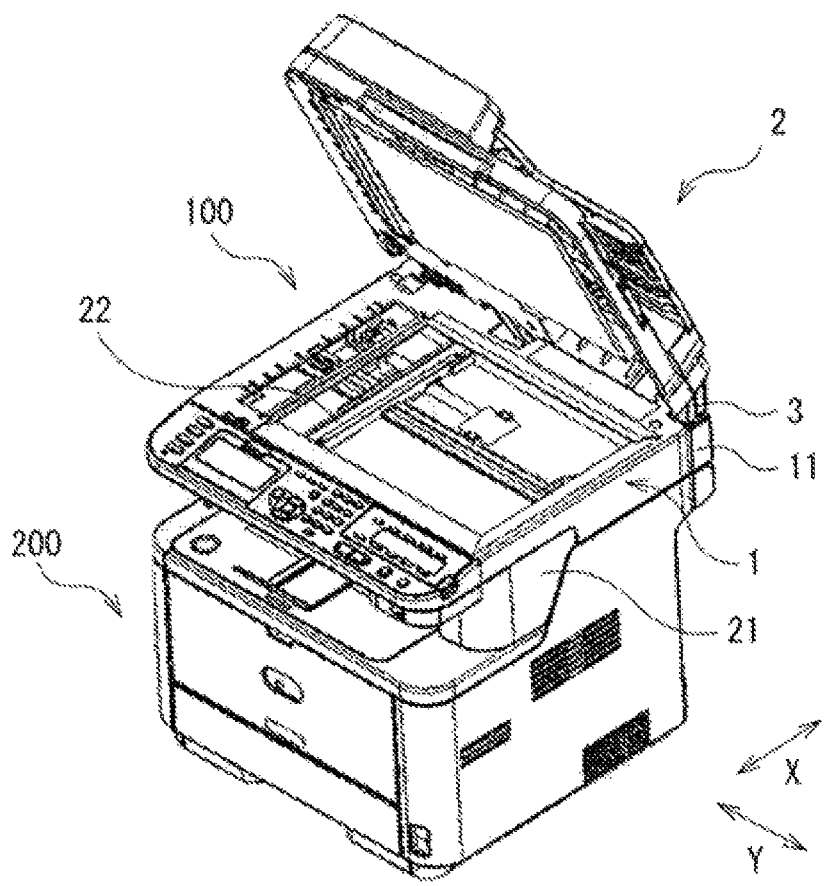
FIG. 1 is a perspective view showing the configuration of an image reading and forming apparatus of an embodiment of this invention.

The overall configuration of the image reading and forming apparatus is explained FIG. 1 shows the perspective-view configuration of the image reading and forming apparatus.

As shown in FIG. 1, this image reading and forming apparatus is provided with an image reading device 100 that reads an image, and an image forming apparatus 200 that forms an image based on the image read by the image reading device 100. Here, the image reading device 100 is disposed on the image forming apparatus 200 for example. Note that the image is formed on the surface of a below-mentioned medium M (see FIG. 11) based on the image read by the image reading device 100.

Below, seen from the image reading device 100, the side where the image forming apparatus 200 is disposed is regarded as the lower side, and seen from the image forming apparatus 200, the side where the image reading device 100 is disposed is regarded as the upper side.

A direction X shown in FIG. 1 corresponds to the extending direction (second direction) of an image reading element 22 that is the main part of the image reading device 100. Also, a direction Y that intersects with the direction X corresponds to the carrying direction (first direction) of a manuscript whose image is read. This manuscript is an original document, such as a printed matter, used for forming an image by the image forming apparatus 200.

The image reading device 100 includes an image reading part 1 that reads an image, and an automatic manuscript carrying part 2 that has a manuscript automatically carried to the image reading part 1. The image reading part 1 and the automatic manuscript carrying part 2 are disposed so as to overlap with each other for example, and the automatic manuscript carrying part 2 is openable utilizing a hinge 3 for example. Note that shown in FIG. 1 is a state where the automatic manuscript carrying part 2 is open.

The image reading part 1 includes an upper frame 11 and a lower frame 21. The upper frame 11 and the lower frame 21 are combined with each other, and in the internal space formed by the upper frame 11 and the lower frame 21, the above-mentioned image reading element 22 and others are contained.

In order to be able to form an image in the image forming apparatus 200, this image reading part 1 reads the image of a manuscript placed on the image reading part 1 (a below-mentioned first image reading platform 12) and also reads the image of a manuscript carried onto the image reading part 1 (a below-mentioned second image reading platform 13) by the automatic manuscript carrying part 2.

The automatic manuscript carrying part 2 can automatically and continuously carry one or more manuscripts and is so-called a feeder.

The image forming apparatus 200 is so-called a printer. The kind of this printer is not particularly limited but a laser printer or the like for example.

<1-2. Configuration of the Image Reading Device>

Next, the configuration of the image reading device 100 is explained. Here, mainly explained is the configuration of the image reading part 1 that is the main part of the image reading device 100.

[Main Configuration of the Image Reading Part]

Figure 2:
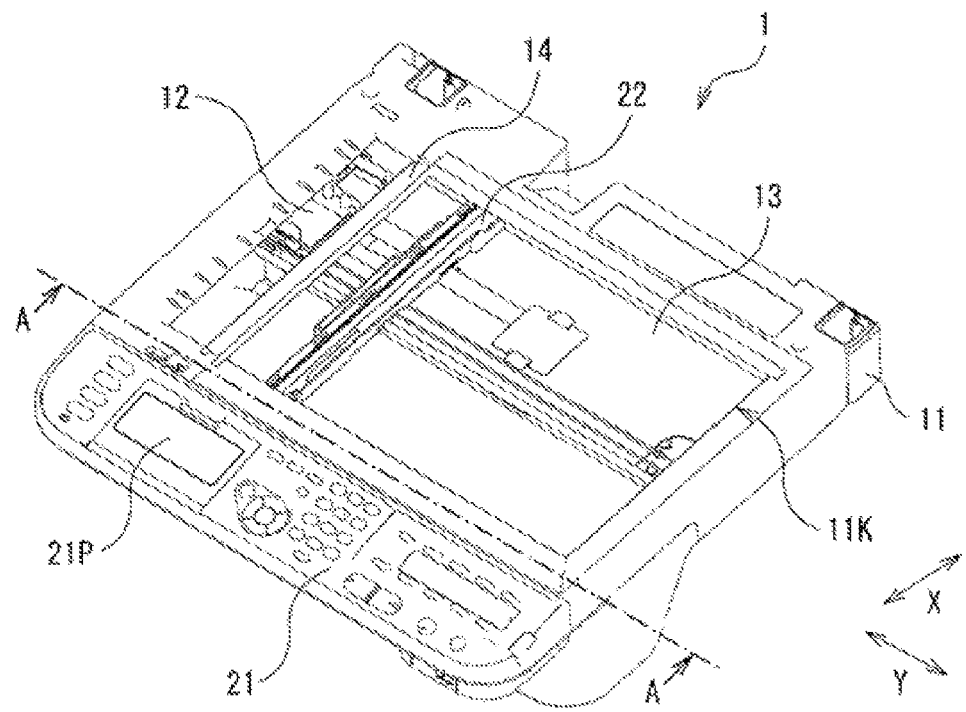
FIG. 2 is a perspective view showing the configuration of an image reading part shown in FIG. 1 seen from the upper side.
Figure 3:
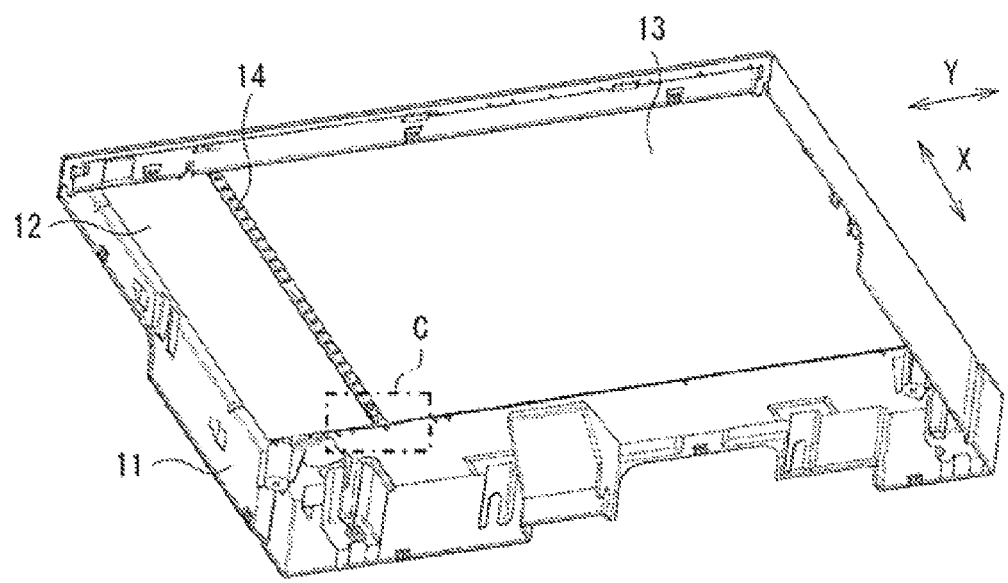
FIG. 3 is a perspective view showing the configuration of an upper frame shown in FIG. 2 seen from the lower side.
Figure 4:
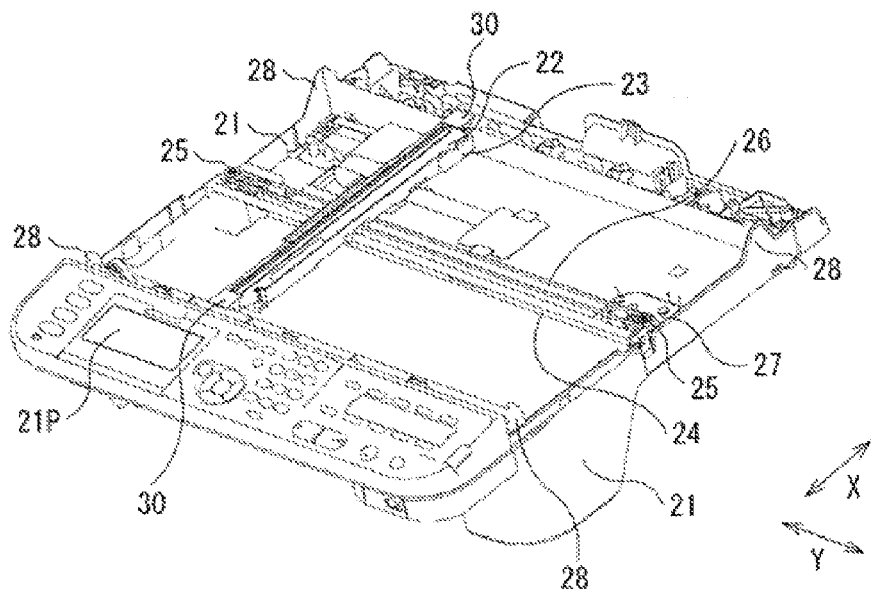
FIG. 4 is a perspective view showing the configuration of a lower frame shown in FIG. 2 seen from the upper side.
Figure 5:
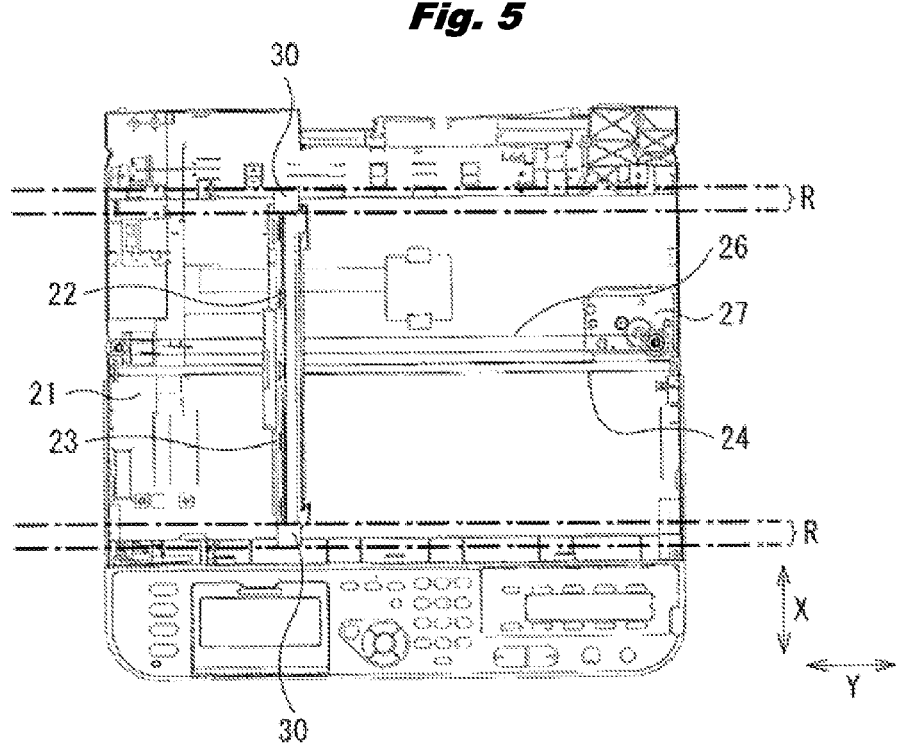
FIG. 5 is a plan view showing the configuration of the lower frame shown in FIG. 2 seen from the upper side.

FIG. 2 shows the perspective-view configuration of the image reading part 1 shown in FIG. 1 seen from the upper side. FIG. 3 shows the perspective-view configuration of the upper frame 11 shown in FIG. 2 seen from the lower side. FIG. 4 shows the perspective-view configuration of the lower frame 21 shown in FIG. 2 seen from the upper side. FIG. 5 shows the plan-view configuration of the lower frame 21 shown in FIG. 2 seen from the upper side.

Figure 6:
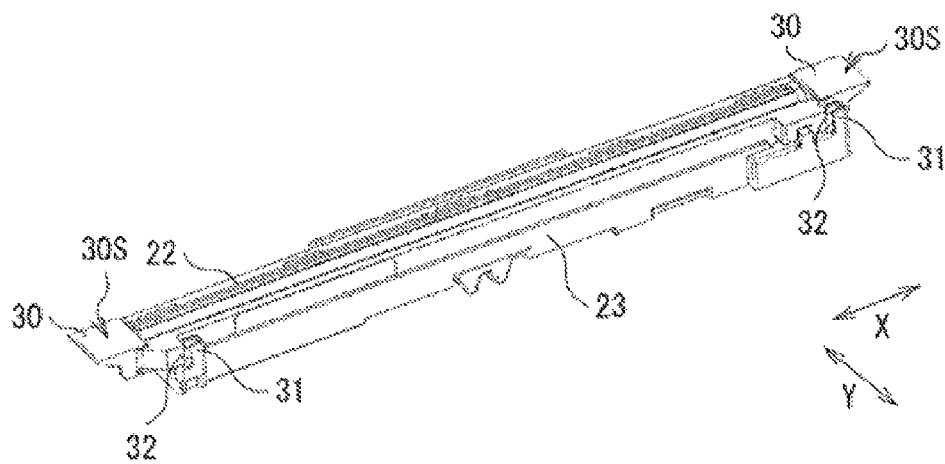
FIG. 6 is a perspective view showing the configuration of an image reading element and others.
Figure 7:
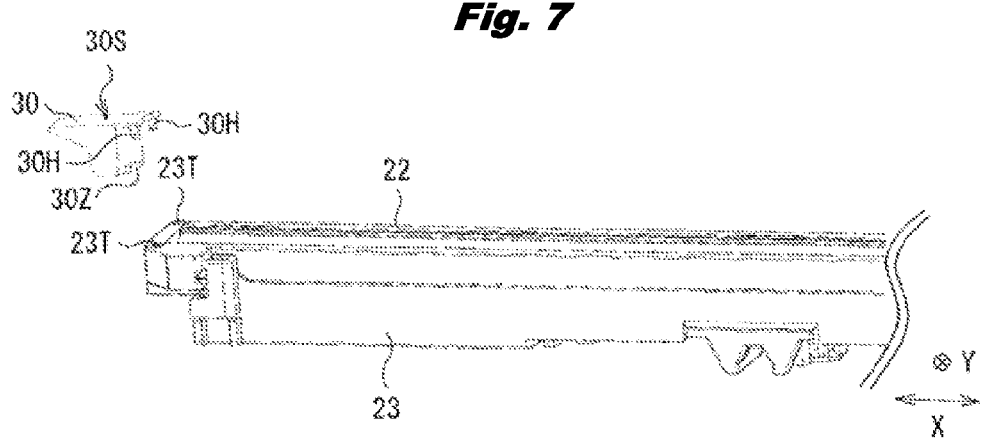
FIG. 7 is a perspective view showing enlarged part of the configuration of the image reading element and others shown in FIG. 6.

FIG. 6 shows the perspective-view configuration of the image reading element 22 and others. FIG. 7 shows enlarged part of the perspective-view configuration of the image reading element 22 and others shown in FIG. 6. Note that shown in FIG. 6 is a state where a pair of sliding members 30 is attached to the image reading element 22, and shown in FIG. 7 is a state where the pair of sliding members 30 is detached.

As shown in FIGS. 2 and 3, the image reading part 1 includes, along with the above-mentioned upper frame 11, a first image reading platform 12, a second image reading platform 13, and a separation member 14.

The upper frame 11 is a supporting member that supports the first image reading platform 12, the second image reading platform 13, and the separation member 14. This upper frame 11 has, for example, a box shape with its side facing the lower frame 21 open, and has an opening 11K on its surface facing the lower frame 21. Note that the upper frame 11 is formed of, for example, one or more kinds of plastic materials such as polycarbonate (PC) and a copolymer of acrylonitrile, butadiene, and styrene (ABS).

The first image reading platform 12 and the second image reading platform 13 are disposed (arranged) so as to adjoin each other in the Y direction and are separated (spaced apart) from each other via the separation member 14. The first image reading platform 12 is disposed in the upstream side of the direction of carrying a manuscript by the automatic manuscript carrying part 2, and also the second image reading platform 13 is disposed in the downstream side of the direction of carrying the manuscript.

The first image reading platform 12 is used, for example, for reading the image of a manuscript carried onto the first image reading platform 12 by the automatic manuscript carrying part 2. In this image reading process, if the image reading element 22 is positioned facing the first image reading platform 12, the manuscript is carried while the image reading element 22 remains stationary. Thereby, the image of the manuscript is read by the image reading element 22.

The second image reading platform 13 is, for example, used for reading the image of a manuscript placed on the second image reading platform 13. In this image reading process, if the image reading element 22 is positioned facing the second image reading platform 13, the image reading element 22 moves while the manuscript remains stationary. Thereby, the image of the manuscript is read by the image reading element 22.

Note that each of the first image reading platform 12 and the second image reading platform 13 is formed of a transparent material such as glass, and is attached to the bottom surface of the upper frame 11 via an adhesive member such as a double-sided tape.

In order to have the first image platform 12 and the second image reading platform 13 spaced apart, the separation member 14 is disposed between the first image reading platform 12 and the second image reading platform 13. This separation member 14 has, as shown in FIG. 9 mentioned below for example, a cross section in an approximate right-angled triangle shape for sending the manuscript carried by the automatic manuscript carrying part 2 back to the automatic manuscript carrying part 2 via the first image reading platform 12.

This separation member 14 is disposed so as to divide the opening 11K provided on the upper frame 11 into two regions, and is also supported by the upper frame 11. Thereby, the first image reading platform 12 is disposed so as to block one region, and the second image reading platform 13 is disposed so as to block the other region. Note that the separation member 14 is formed of a similar plastic material to that of the upper frame 11 for example.

Also, the image reading part 1 includes, as shown in FIGS. 4 and 5 for example, along with the lower frame 21 and the image reading element 22 mentioned above, a carriage 23, a shaft 24, two rotation shafts 25, a timing belt 26, a motor 27, and the pair of sliding members 30.

The lower frame 21 supports the image reading element 22, the carriage 23, and others, and has a box shape with its side facing the upper frame 11 open for example. Note that the lower frame 21 is formed of a similar plastic material to that of the upper frame 11 for example.

Provided on this lower frame 21 is, for example, an operation panel 21P for operating the image reading and forming apparatus. This operation panel 21P is provided with a display panel, various kinds of buttons, and others for example.

Also, provided on the lower frame 21 are protruding ribs 28 for maintaining the distance between the upper frame 11 and the lower frame 21 constant. The number and positions of these ribs 28 are not particularly limited. Here, for example, four pieces of ribs 28 are disposed at four corners of the lower frame 21.

The carriage 23 is disposed below the first image reading platform 12 and the second image reading platform 13, and is a moving member that can reciprocate in the carrying direction (Y direction) of the manuscript mentioned above. This carriage 23 extends in the X direction for holding the image reading element 22, and the shaft 24 extending in the Y direction is inserted through the carriage 23. Also, the carriage 23 has, for example, a box shape with its side facing the first image reading platform 12 and the second image reading platform 13 open, and the image reading element 22 is contained inside the carriage 23. Note that the carriage 23 is formed of one or more kinds of plastic materials such as polyphenylene ether (PPE) and polystyrene (PS) for example.

Both end parts of the shaft 24 are fixed to the lower frame 21. One of the rotation shafts 25 is disposed in the vicinity of one end part of the shaft 24, and the other rotation shaft 25 is disposed in the vicinity of the other end part of the shaft 24. These two rotation shafts 25 can rotate by utilizing the drive force of the motor 27. The timing belt 26 is stretched by the two rotation shafts 25 and can move according to the rotation of the two rotation shafts 25. Thereby, the carriage 23 can move along the shaft 24 according to the rotational movement of the timing belt 26.

In order to read the image of a manuscript, the image reading element 22 includes a sensor such as CIS (Contact Image Sensor) for example. Because this image reading element 22 is held by the carriage 23 as mentioned above, it is disposed below the first image reading platform 12 and the second image reading platform 13. Thereby, the image reading element 22 can reciprocate according to the reciprocating movement of the carriage 23.

This image reading element 22 reads an image via the first image reading platform 12 in a position facing the first image reading platform 12, and also reads an image via the second image reading platform 13 in a position facing the second image reading platform 13. Note that the details of the position facing the first image reading platform 12 and the position facing the second image reading platform 13 are mentioned below (see FIGS. 12-16).

The size (length) of the image reading element 22 in the X direction is, for example, greater than the size of the first image reading platform 12 and the size of the second image reading platform 13 in the X direction. Thereby, the image reading element 22 can read the image of the whole manuscript via the first image reading platform 12, and also can read the image of the whole manuscript with the maximum width via the second image reading platform 13.

The pair of sliding members 30 is disposed in the side where the image reading element 22 opposes the first image reading platform 12 and the second image reading platform 13, and that is, disposed below the first image reading platform 12 and the second image reading platform 13. Also, the pair of sliding members 30 is disposed so as to be spaced apart in the X direction. Specifically, for example, the pair of sliding members 30 is disposed on both end parts of the image reading element 22 extending in the X direction and is held by that image reading element 22. Note that the pair of sliding members 30 is formed of one or more kinds of plastic materials such as polyacetal (or polyoxymethylene: POM) for example.

As shown in FIG. 5, this pair of sliding members 30 can slide on a pair of sliding paths R extending in the Y direction according to the reciprocating movement of the image reading element 22. This pair of sliding paths R is provided so as to overlap partially with the first image reading platform 12 and the second image reading platform 13 in the X direction.

Below, in explaining "both sides of an arbitrary component in the X direction", it is simply explained as "outside an arbitrary component". This "an arbitrary component" part is replaced with the name(s) of one or more kinds of the components of the image reading and forming apparatus.

More specifically, as shown in FIG. 5, when the first image reading platform 12 and the second image reading platform 13 are seen from the upper side, the pair of sliding paths R overlaps partially with the first image reading platform 12 and the second image reading platform 13 as mentioned above.

Also, as shown in FIGS. 6 and 7 for example, the pair of sliding members 30 protrudes to the outside of the image reading element 22 at both end parts of the image reading element 22. The top surface (sliding surface 30S) of each of this pair of sliding members 30 is curved so as to have an upward convex shape in the Y direction for example, and protrudes more toward the first image reading platform 12 and the second image reading platform 13 than the image reading element 22.

This pair of sliding members 30 is, for example, detachably attached to the image reading element 22. Specifically, for example, each of one end part and the other end part of the image reading element 22 is provided with two upward grooves 23T, and also each of the pair of sliding members 30 is provided with two downward protrusions 30H. By these two protrusions 30H being fitted in the two grooves 23T, the pair of sliding members 30 is fixed to the image reading element 22. In this case, for example, each of the pair of sliding members 30 is further provided with a sideward protrusion 30Z, and the protrusion 30Z may be fitted in a sideward groove provided on each of one end part and the other end part of the image reading element 22.

Each of one end part and the other end part of the carriage 23 is provided with, for example, a bearing part 31 extending in the X direction, and a shaft 32 extending in the X direction is inserted through the bearing part 31. Thereby, each of the pair of sliding members 30 can turn up and down centering on the shaft 32.

Note that because provided between the carriage 23 and the pair of sliding members 30 are bias members (elastic members) 33 such as springs mentioned below (see FIG. 9), the pair of sliding members 30 is biased to the first image reading platform 12 and the second image reading platform 13 by the bias member 33. Thereby, the pair of sliding members 30 slides on the pair of sliding paths R while pressed onto the first image reading platform 12 and the second image reading platform 13 by utilizing restorative forces of the bias members 33.

[Detailed Configuration of the Image Reading Part]

Figure 10:
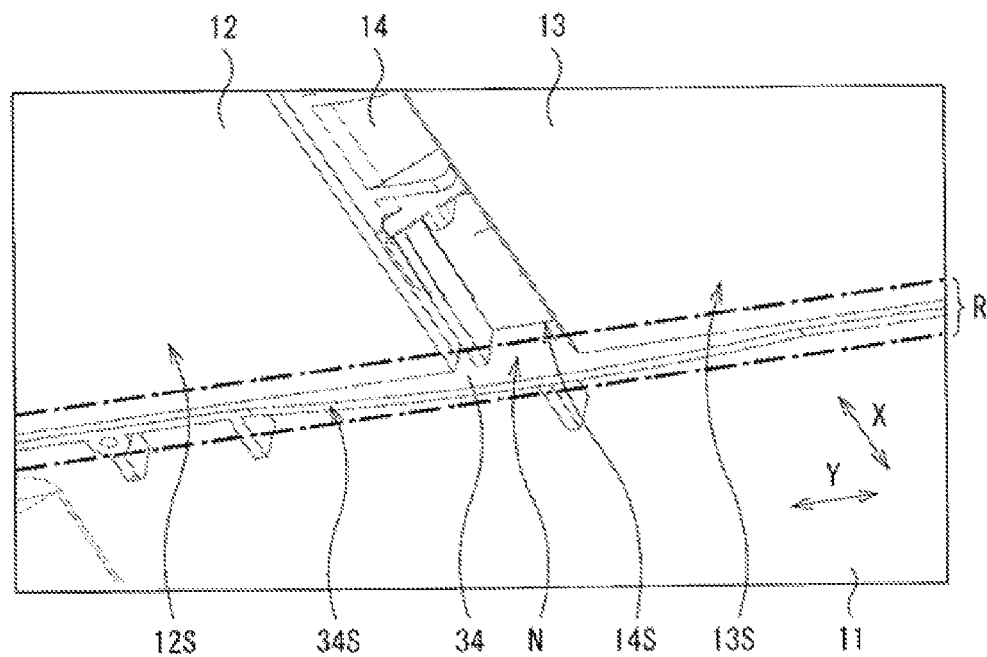
FIG. 10 is a perspective view showing enlarged part (part C) of the configuration of the upper frame shown in FIG. 3.

FIG. 8 shows the cross-sectional configuration along a line A-A of the image reading part 1 shown in FIG. 2. FIG. 9 shows enlarged part (part B) of the cross-sectional configuration of the image reading part 1 shown in FIG. 8. FIG. 10 shows enlarged part (part C) of the perspective-view configuration of the upper frame 11 shown in FIG. 3.

As shown in FIGS. 8-10, the image reading element 22 and the pair of sliding members 30 are disposed below the first image reading platform 12 and the second image reading platform 13. Also, as mentioned above, the pair of sliding members 30 disposed on the pair of sliding paths R (see FIG. 5) is biased to the first image reading platform 12 and the second image reading platform 13 by the bias members 33.

As shown in FIGS. 9 and 10, the first image reading platform 12 and the second image reading platform 13 are separated from each other via the separation member 14, and the bottom surface 14S of the separation member 14 is recessed from the bottom surface 12S of the first image reading platform 12 and the bottom surface 13S of the second image reading platform 13. Thereby, a height difference N is formed between the first image reading platform 12 and the second image reading platform 13.

A pair of protrusions 34 is provided on part of the pair of sliding paths R positioned on both sides of the separation member 14 in the X direction, that is, the part positioned outside the separation member 14. In other words, as shown in FIG. 10, when the first image reading platform 12 and the second image reading platform 13 are seen from the lower side, the pair of protrusions 34 is disposed outside the first image reading platform 12 and the second image reading platform 13 so as not to overlap with the first image reading platform 12 and the second image reading platform 13.

This pair of protrusions 34 protrudes downwards more than the bottom surface 12S of the first image reading platform 12 and the bottom surface 13S of the second image reading platform 13, that is, in a direction approaching the pair of sliding members 30. Note that the pair of protrusions 34 is formed of a similar plastic material to that of the upper frame 11 for example.

Here, the pair of the protrusions 34 achieves a function to have the pair of sliding members 30 detour so as not to pass through the height difference N when the pair of sliding members 30 passes through the vicinity of the height difference N during the reciprocating movement of the image reading element 22. That is, when the image reading element 22 reciprocates between the position facing the first image reading platform 12 and the position facing the second image reading platform 13, the pair of sliding members 30 moves on the pair of sliding paths R by climbing over the pair of protrusions 34. Thereby, the pair of sliding members 30 bypasses the height difference N without passing through the height difference N. Therefore, the image reading element 22 can be prevented from vibrating due to the pair of sliding members 30 vibrating when passing through the height difference N. Note that the details of the detour movement of the pair of sliding members 30 are mentioned below (see FIGS. 12-16).

Note that the pair of protrusions 34 should desirably be disposed in symmetrical positions via the separation member 14. That is, one protrusion 34 and the other protrusion 34 should desirably oppose each other via the separation member 14. It is because when the pair of sliding members 30 bypasses the height difference N by utilizing the pair of protrusions 34, the timing when one sliding member 30 climbs over one protrusion 34 and the timing when the other sliding member 30 climbs over the other protrusion 34 tend to coincide. Thereby, when the pair of sliding members 30 climbs over the pair of protrusions 34, it becomes more difficult for the pair of sliding members 30 to vibrate.

[Detailed Configuration of the Pair of Protrusions]

Each of the pair of protrusions 34 has a bottom surface (protruding surface 34S) protruding farther downwardly from the first image reading platform 12 and the second image reading platform 13. The shape of the protrusions 34 defined by this protruding surface 34S is not particularly limited.

Above all, the shape of the protrusions 34 should desirably be the shape explained below. Meant by the shape explained here is the planar shape of the protrusions 34 seen from the X direction as shown in FIG. 9.

In the position where one surface (bottom surface 12S) of the first image reading platform 12 on the side opposed by the image reading element 22 and the protruding surface 34S of each of the pair of protrusions 34 intersect, the angle θ defined by the bottom surface 12S and the protruding surface 34S should be smaller than 90°. That is, in the process where the sliding member 30 slides by climbing over the protrusions 34 according to the reciprocating movement of the image reading element 22, the shape of the part of the protrusions 34 where the sliding member 30 starts climbing over or the sliding member 30 finishes climbing over should desirably have an acute angle. In this case, the part where the sliding member 30 starts climbing over is sloped so as to become gradually higher, and also the part where the sliding member 30 finishes climbing over is sloped so as to become gradually lower. Thereby, it becomes easier for the sliding member 30 to climb over the protrusion 34. Therefore, because it becomes hard for the sliding member 30 to vibrate in the sliding process, it also becomes hard for the image reading element 22 to vibrate.

The surface condition of the above-mentioned part having an acute angle shape (called "acute-angle part" below) is not particularly limited. That is, the surface of the acute-angle part may be a flat surface, a curved surface, or a surface where both of them coexist. Above all, the surface of the acute-angle part should desirably include a curved surface because it becomes harder for the sliding member 30 to vibrate.

Also, the angle θ is not particularly limited as far as it is smaller than 90°. Above all, the angle θ should desirably be as small as possible because the slope of the acute-angle part becomes gentle, making it harder for the sliding member 30 to vibrate.

What was mentioned in regards to the relation between the bottom surface 12S of the first image reading platform 12 and the protruding surface 34S of the protrusion 34 also applies to the relation between the bottom surface 13S of the second image reading platform 13 and the protruding surface 34S of the protrusion 34. That is, the angle θ defined by the bottom surface 13S and the protruding surface 34S should desirably be smaller than 90°. Also, the surface condition of the acute-angle part is not particularly limited, and the angle θ is not particularly limited as far as it is smaller than 90°.

In this case, the contour of the protruding surface 34S should desirably not include two or more mutually-connected lines but be formed of curves only. Also, if the contour of the protruding surface 34S contains two or more lines, it is desirable that the two lines are not mutually connected and that each line is connected with a curve because it becomes harder for the sliding member 30 to vibrate.

To be detailed, if two lines are mutually connected, because an angular part is formed on that connecting spot, when the sliding member 30 passes through the angular part, it becomes easy for the sliding member 30 to vibrate at that angular part. As opposed to this, if a line is connected to a curve, because no angular part is formed on that connecting spot, even if the contour of the protruding surface 34S includes a line, it becomes hard for the sliding member 30 to vibrate.

Above all, the contour of the protruding surface 34S should desirably be formed of curves only, and more specifically, should desirably be in an arc shape (a curve that is convex toward the protruding direction of the protrusion 34) because it becomes significantly hard for the sliding member 30 to vibrate. Note that shown in FIGS. 9 and 10 is a case where the contour of the protruding surface 34S is in an arc shape.

Also, the width W of the protrusion 34 should desirably be greater than the height H of the protrusion 34 because the slope of the acute-angle part becomes gentle, making it harder for the sliding member 30 to vibrate. Above all, especially in the case where the contour of the protruding surface 34S is in an arc shape, if the width W is greater than the height H, the curvature of the arc becomes large, making it significantly hard for the sliding member 30 to vibrate.

Note that the shape of one protrusion 34 and the shape of the other protrusion 34 may be the same or different. However, in order to suppress the vibration of the sliding members 30, the shape of one protrusion 34 and the shape of the other protrusion 34 should desirably be the same.

The formation range of the pair of protrusions 34 is not particularly limited. That is, the pair of protrusions 34 may be disposed only on part of the pair of sliding paths R positioned outside the separation part 14 as mentioned above, or may be extended to the other part.

Above all, the pair of protrusions 34 should desirably be extended to positions partially overlapping with one or both of the first image reading platform 12 and the second image reading platform 13 in the Y direction, and more desirably be extended to positions partially overlapping with both the first image reading platform 12 and the second image reading platform 13. It is because the slope of the acute-angle part becomes gentler, making it harder for the sliding members 30 to vibrate. Note that shown in FIGS. 9 and 10 is a case where the formation range of the pair of protrusions 34 is extended to positions partially overlapping with both the first image reading platform 12 and the second image reading platform 13.

One of both of the pair of protrusions 34 may be either fixed to the upper frame 11 or not fixed to the upper frame 11.

Above all, the protrusions 34 should desirably be fixed to the upper frame 11 because even if an external stress is unintentionally supplied to the upper frame 11, it becomes easy for the sliding members 30 to bypass the height difference N stably by utilizing the protrusions 34. Note that shown in FIGS. 9 and 10 is a case where the protrusions 34 are fixed to the upper frame 11.

To be detailed, as mentioned above, the upper frame 11 supports the first image reading platform 12 and the second image reading platform 13, and the protrusions 34 protrude downwards more than the bottom surface 12S of the first image reading platform 12 and the bottom surface 13S of the second image reading platform 13.

In the case where the protrusions 34 are not fixed to the upper frame 11, if an external stress is unintentionally supplied to the upper frame 11 downwards from above due to a certain cause, the upper frame 11 warps downwards due to the external stress. Thereby, the positions of the bottom faces 12S and 13S shift downwards from their original positions, that is, the positions when no external stress is supplied to the upper frame 11. In this case, even though the positions of the protruding faces 34S do not change, because the positions of the bottom faces 12S and 13S shift downwards, depending on the warp amount of the upper frame 11 (=the shift amounts of the positions of the bottom faces 12S and 13S), the protrusions 34 may not protrude downwards more than the first image reading platform 12 and the second image reading platform 13. Thereby, although the sliding paths R are provided with the protrusions 34, it becomes hard for the sliding members 30 to bypass the height difference N by utilizing the protrusions 34. Therefore, it could become easier for the image reading element 22 to vibrate due to the vibration of the sliding members 30.

As opposed to this, in the case where the protrusions 34 are fixed to the upper frame 11, if the upper frame 11 warps downwards due to an external stress as mentioned above, the positions of the bottom faces 12S and 13S shift downwards, and the positions of the protruding faces 34S also shift downwards in a similar manner. In this case, because the positions of the bottom faces 12S and 13S and the positions of the protruding faces 34S shift downwards together, the relation that the protrusions 34 protrude downwards more than the first image reading platform 12 and the second image reading platform 13, that is, the positional relation between the protrusions 34 and the first image reading platform 12 and the second image reading platform 13 is maintained independently of the warp amount of the upper frame 11. Thereby, even if an external stress is supplied to the upper frame 11, the protrusions 34 remains protruding downwards more than the first image reading platform 12 and the second image reading platform 13. Therefore, independently of whether an external stress is supplied to the upper frame 11 or not, it becomes easy for the sliding members 30 to bypass the height difference N by utilizing the protrusions 34, making the image reading element 22 stable and hard to vibrate.

Note that in the case where the pair of protrusions 34 is fixed to the upper frame 11, one or both of the pair of protrusions 34 may be either integrated with the upper frame 11 or not integrated with the upper frame 11.

Above all, the protrusions 34 should desirably be integrated with the upper frame 11 because it becomes easier to maintain the positional relation between the above-mentioned protrusions 34 and the first image reading platform 12 and the second image reading platform 13, and the number of components of the image reading device can be small.

Also, in the case where the protrusions 34 are not integrated with the upper frame 11 although the protrusions 34 are fixed to the upper frame 11, as shown in FIGS. 12-16 mentioned below for example, the protrusions 34 should desirably be fixed to the upper frame 11 so that the protrusions 34 and the upper frame 11 overlap with each other when seen from the X direction. That is, the protrusions 34 should desirably be fixed to a side surface of the upper frame 11. It is because compared with the case where the protrusions 34 are attached to the bottom surface of the upper frame 11, it is easy to control the fixing positions of the protrusion 34 to be in the desired positions.

(Actual Sizes of Sliding Members 30 and Protrusions 34)

Figure 25:
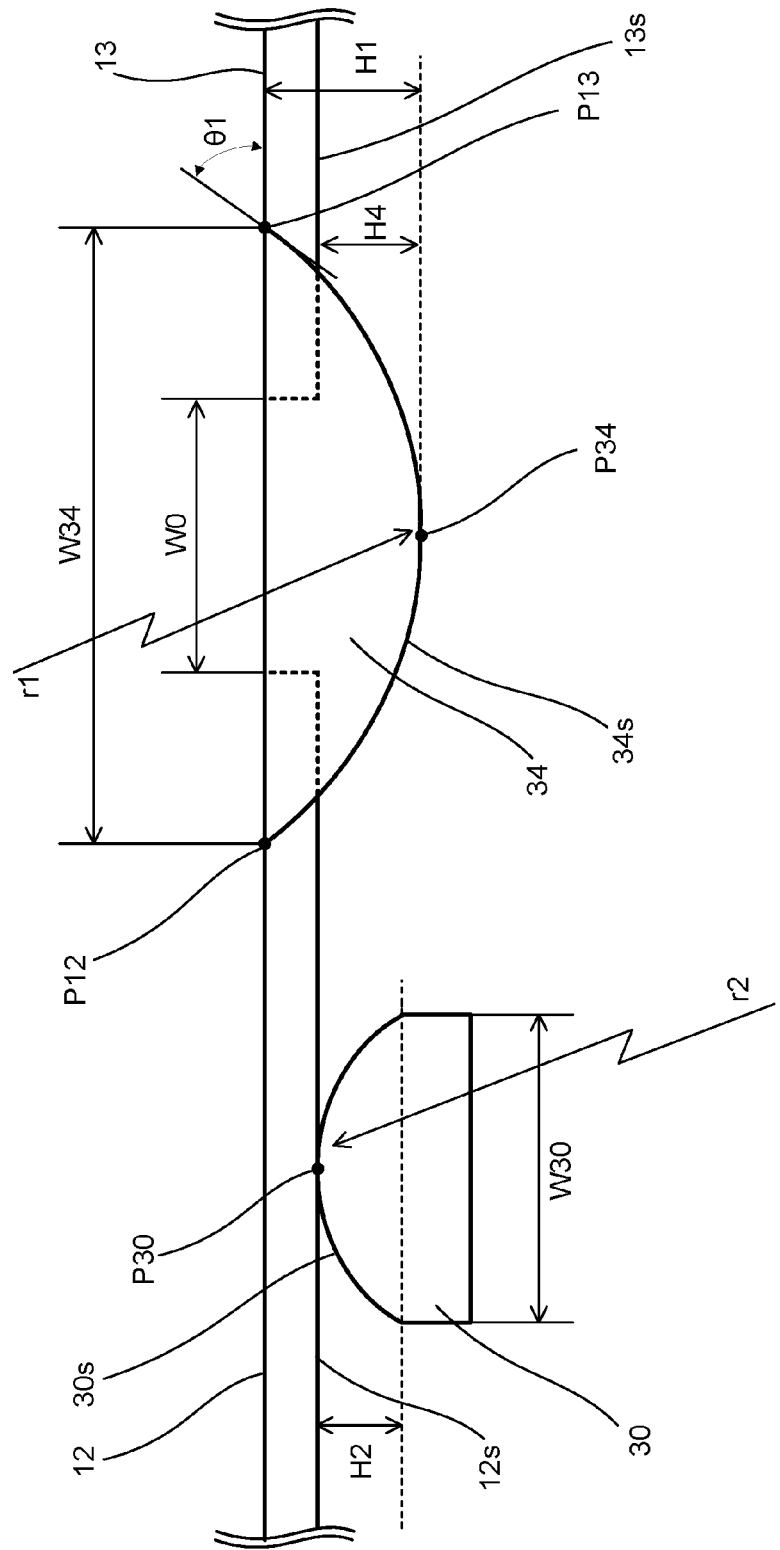
FIG. 25 is a schematic view with references of the measurable items regarding sliding members 30, protrusions 34 and the surroundings.

Actual sizes of sliding members 30 and protrusions 34 are described below referring to FIG. 25. For illustrating purpose, the shapes of them are modified. It is noted that the drawing does not depict actual shapes or actual proportions of sizes.

In the sliding direction, which is horizontal (right-left) in the drawing, width W30 of sliding member 30 is 18 mm, height H2 of the convex portion of the sliding member, which is vertical (up-down) in the drawing, is 0.6 mm. Radius r2 of the convex portion around at top point P30 is 67.8 mm. Since top point P30 of the convex portion is in contact with lower surface 12s of plate 12, height H2 may be measured from the lower surface.

Width W34 of protrusion 34 is 53.8 mm. Height H1 of the protrusion is 3.45 mm. Height H4, which is vertically between top point P34 and either plate 12 or plate 13, is 0.65 mm. Since plate 12 and plate 13 have the same thickness in the embodiment, height H4 measured from lower surface 12s is the same as that measured from lower surface 13s. A tangential line at point P13 where the outer edge of the protrusion meets the upper surface of plate 13 makes angle θ1 with the upper surface of the plate. Angle θ1 is 14.2°. In the embodiment, the protrusion is symmetric in the sliding direction, another angle at point P12, which is at the opposite side, has the same amount as angle θ 1. Not to mention, the angle at P12 is not necessary to be the same as angle θ 1.

Comparing sliding members 30 with protrusions 34, the following relationships are preferred:

$r1 > r2$ $W1 > W2$ $H4 > H2$

Gap width W0 that is determined between the plate 12 and plate 13 is 7.2 mm.

Several ratios among the above sizes can be modified with a certain range. For example, ratio of H2/W30 above is 3.33% but the ratio may fall within 1% to 6%. Other ratios of H4/W34, H2/H4, r2/r1, W30/W34 etc. can be set within certain ranges using engineer's knowledge.

<1-3. Configuration of the Image Forming Apparatus>

Figure 11:
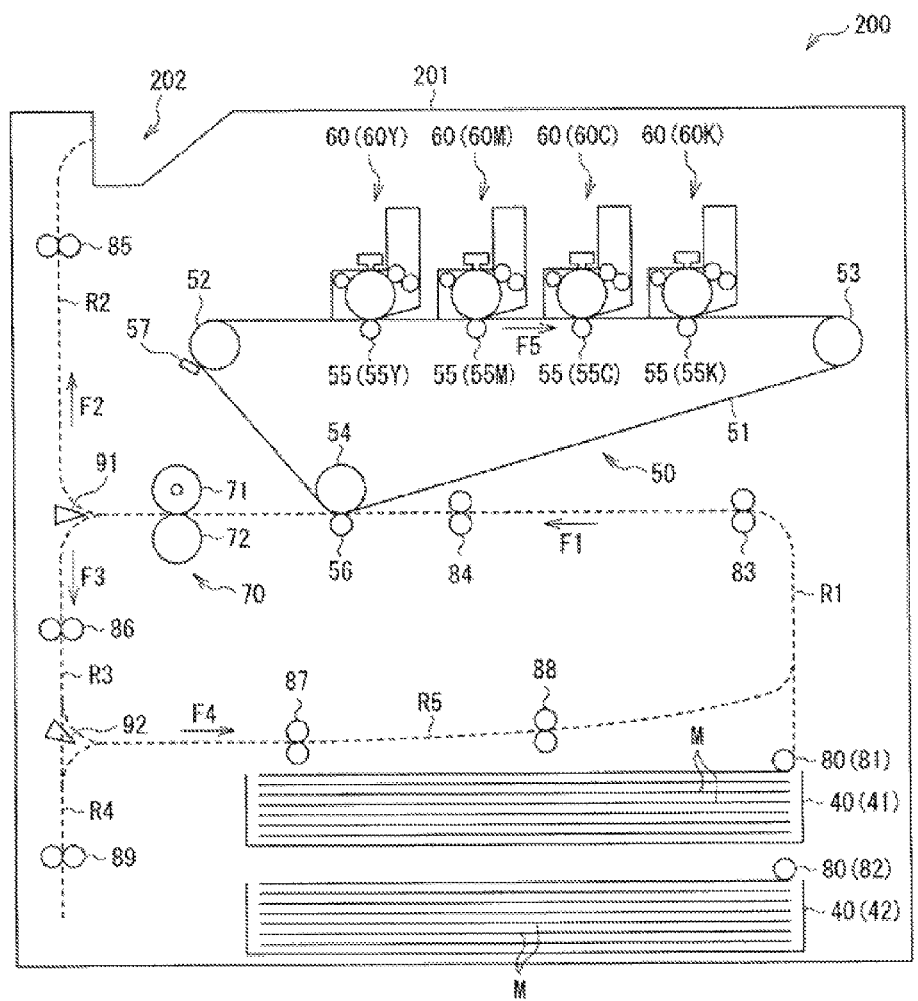
FIG. 11 is a diagram showing the configuration of an image forming apparatus.

Next, the configuration of the image forming apparatus 200 is explained FIG. 11 shows the configuration of the image forming apparatus 200.

The image forming apparatus 200 explained here is, for example, a full-color printer of an intermediate transfer system that forms an image on the surface of a medium M. Although the kind of this medium M is not particularly limited, it is one or more kinds of paper, film, and the like for example.

The image forming apparatus 200 is provided, inside a housing 201 for example, with one or more trays 40, a transfer part 50, one or more development devices 60, a fuser part 70, one or more forwarding rollers 80, carrying rollers 83-89, and carrying path switching guides 91 and 92. Provided on this housing 201 is a stacker part 202 for ejecting the medium M having an image formed. Note that broken lines R1-R5 indicate the carrying path of the medium M.

The tray 40 contains the medium M and is detachably attached to the housing 201 for example. Contained inside this tray 40 are, for example, multiple media M in a stacked state, and those multiple media M are taken out one by one from the tray 40 by the forwarding roller 80.

Here, the image forming apparatus 200 is provided with two trays 40 (41 and 42) and two forwarding rollers 80 (81 and 82) for example. Note that the trays 41 and 42 are disposed so as to overlap with each other for example.

The transfer part 50 includes an intermediate transfer belt 51, a drive roller 52, a driven roller (idle roller) 53, a backup roller 54, one or more primary transfer rollers 55, a secondary transfer roller 56, and a cleaning blade 57.

The intermediate transfer belt 51 is an intermediate transfer medium, to which toner images are temporarily transferred before the toner images are transferred to the surface of the medium M. When this intermediate transfer belt 51 is supported and stretched by the drive roller 52, the driven roller 53, and the backup roller 54, it can move in the clockwise direction by utilizing the rotational force of the drive roller 52.

The drive roller 52 can rotate in the clockwise direction via a drive source such as a motor. Each of the driven roller 53 and the backup roller 54 can rotate in the clockwise direction in a similar manner to the drive roller 52 by utilizing the rotational force of the drive roller 52.

The primary transfer rollers 55 transfer (primary-transfer) the toner images formed by the development devices 60 to the intermediate transfer belt 51. These primary transfer rollers 55 are pressed against the development devices 60 via the intermediate transfer belt 51. Note that the primary transfer rollers 55 can rotate clockwise according to the movement of the intermediate transfer belt 51.

Here, the transfer part 50 includes four primary transfer rollers 55 (55Y, 55M, 55C, and 55K) corresponding to the four development devices 60 (60Y, 60M, 60C, and 60K).

The secondary transfer roller 56 transfers (secondary-transfers) the toner images transferred to the surface of the intermediate transfer belt 51 to the surface of the medium M. This secondary transfer roller 56 is pressed against the backup roller 54 and can rotate anticlockwise according to the movement of the intermediate transfer belt 51.

The cleaning blade 57 scrapes off unnecessary toners remaining on the surface of the intermediate transfer belt 51.

In order to form a toner image, each of the development devices 60 forms an electrostatic latent image and also has a toner adhere to the electrostatic image by utilizing Coulomb force. Each of these development devices 60 includes a photosensitive drum, an LED head, and the like for example. Here, the image forming apparatus includes for development devices 60 (60Y, 60M, 60C, and 60K) for example.

Also, the development devices 60Y, 60M, 60C, and 60K are each detachably attached to the housing 201 and also arranged along the moving path of the intermediate transfer belt 51. Here, for example, the development devices 60Y, 60M, 60C, and 60K are arranged in this order from the upstream side (the side closer to the drive roller 52) toward the downstream side (the side closer to the driven roller 53) in the movement direction of the intermediate transfer belt 51.

Contained each in the development devices 60Y, 60M, 60C, and 60K are toners of different colors from one another for example. Specifically, contained in the development device 60Y is a yellow toner for example. Contained in the development device 60M is a magenta toner for example. Contained in the development device 60C is a cyan toner for example. Contained in the development device 60K is a black toner for example.

The fuser part 70 fuses the toner images to the surface of the medium M using a pressure application process and a heat application process. This fuser part 70 includes a heat application roller 71 and a pressure application roller 72 for example.

The heat application roller 71 includes a heater or the like for example, and can rotate clockwise through a drive source such as a motor.

The pressure application roller 72 is pressed against the heat application roller 71 and can rotate anticlockwise according to the rotation of the heat application roller 71.

The carrying rollers 83-89 carry the medium M taken out by the forwarding roller 80 inside the housing 201. If the images are formed on only one side of the medium M, the medium M is carried by the carrying rollers 83-85 along the carrying paths R1 and R2 for example. If the images are formed on both sides of the medium M, the medium M is carried by the carrying rollers 83-89 along the carrying paths R1-R5 for example. Note that the details of the carrying paths of the medium M are mentioned below.

The carrying path switching guides 91 and 92 switch the carrying direction of the medium M according to whether the images are formed on only one side of the medium M or the images are formed on both sides of the medium M.

<2. Operations of the Image Reading and Forming Apparatus>

Next, the operations of the image reading and forming apparatus are explained. Below, the operations of the image reading device 100 and the operations of the image forming apparatus 200 are explained in order.

<2-1. Operations of the Image Reading Device>

The image reading device 100 operates in the following manner FIGS. 12-16 show the cross-sectional configuration corresponding to FIG. 9 for explaining the operations of the image reading device 100.

Here, among the operations of the image reading device 100, the operations of the image reading part 1 are explained. In this case, adopted as an example is a case where after performing an image reading operation using the first image reading platform 12, an image reading operation is performed using the second image reading platform 13.

[Initial State]

Figure 12:
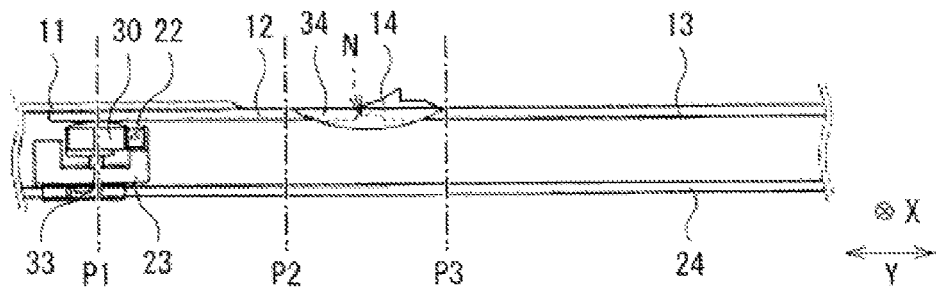
FIG. 12 is a drawing for explaining an operation of the image reading and forming apparatus.

In the initial state, that is, a state before performing an image reading operation, as shown in FIG. 12, the image reading element 22 held by the carriage 23 is positioned in the initial position (refuge position) P1. Because this carriage 23 can reciprocate in the Y direction, the image reading element 22 itself can also reciprocate in the Y direction according to the reciprocating movement of the carriage 23.

The initial position P1 is positioned in the upstream side of a reading position P2 and a reading start position P3 mentioned below in the Y direction (the direction in which the manuscript is carried). In this initial position P1, because the first image reading platform 12 is shielded by the upper frame 11, the image reading element 22 cannot read an image through the first image reading platform 12. Note that, as explained referring to FIG. 9, because the pair of sliding members 30 is biased to the image reading platform 12 by the bias members 33, it is pressed against the first image reading platform 12.

[Image Reading Operation Using the First Image Reading Platform]

Figure 13:
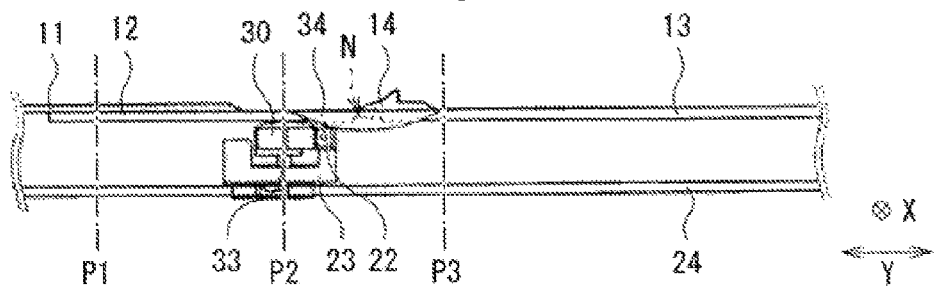
FIG. 13 is a drawing for explaining an operation of the image reading and forming apparatus following FIG. 12.

If the manuscript is carried onto the first image reading platform 12 by the automatic manuscript carrying part 2, as shown in FIG. 13, the image reading element 22 moves from the initial position P1 to the reading position P2 while being contacted by the first image reading platform 12

The reading position P2 is a position facing the first image reading platform 12 for the image reading element 22 to read an image, and more specifically, a position that is in the downstream side of the initial position P1 and in the upstream side of the protrusions 34. In this reading position P2, because the first image reading platform 12 is not shielded by the upper frame 11, once the manuscript is carried onto the first image reading platform 12, the image reading element 22 can read the image of the manuscript through the first image reading platform 12.

If the first image reading platform 12 is used for reading an image, while the image reading element 22 is stationary in the reading position P2, the manuscript carried by the automatic manuscript carrying part 2 moves to the downstream side via the reading position P2. Thereby, the image of the manuscript is read by the image reading element 22.

Once the image reading operation using the first image reading platform 12 is complete, the image reading element 22 returns to the initial position P1 from the reading position P2 for example.

[Image Reading Operation Using the Second Image Reading Platform]

If the manuscript is placed on the second image reading platform 13, as shown in FIGS. 12-16, the image reading element 22 moves from the initial position P1 to the reading start position P3 via the reading position P2.

The reading start position P3 is a position where the image reading element 22 opposes the second image reading platform 13, and more specifically, a position in the downstream side of the pair of protrusions 34. In this reading start position P3, because the second image reading platform 13 is not shielded by the upper frame 11, the image reading element 22 can read the image of the manuscript supplied onto the second image reading platform 13.

If the second image reading platform 13 is used for reading the image of the manuscript, while the manuscript is stationary, the image reading element 22 moves from the reading start position P3 to the downstream side. Thereby, the image of the manuscript is read by the image reading element 22.

Here, if the image reading element 22 moves from the reading position P2 to the reading start position P3, the pair of sliding members 30 bypasses the height difference N by utilizing the pair of protrusions 34 provided on the pair of sliding paths R (see FIG. 5).

To be detailed, once the image reading element 22 starts moving from the reading position P2 toward the reading start position P3, according to the movement of the image reading element 22, the pair of sliding members 30 moves to the downstream side while being contacted by the first image reading platform 12.

Figure 14:
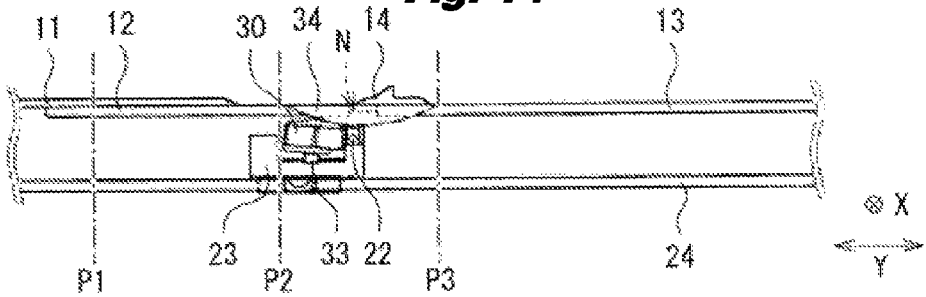
FIG. 14 is a drawing for explaining an operation of the image reading and forming apparatus following FIG. 13.

Subsequently, once the image reading element 22 reaches the vicinity of the height difference N, as shown in FIG. 14, because the pair of protrusions 34 exists on the pair of sliding paths R, the pair of sliding members 30 moves toward the downstream side while being contacted by the pair of protrusions 34 protruding downwards more than the first image reading platform 12 and the second image reading platform 13. Thereby, when the pair of sliding members 30 passes the vicinity of the height difference N, the pair of sliding members 30 climbs up on the pair of protrusions 34. Therefore, the pair of sliding members 30 moves to the downstream side while gradually going away from the first image reading platform 12. Note that as explained referring to FIG. 9, because the image reading element 22 can turn up and down centering on the shaft 31, it moves to the downstream side while following the sliding operation of the pair of sliding members 30 mentioned above.

Figure 15:
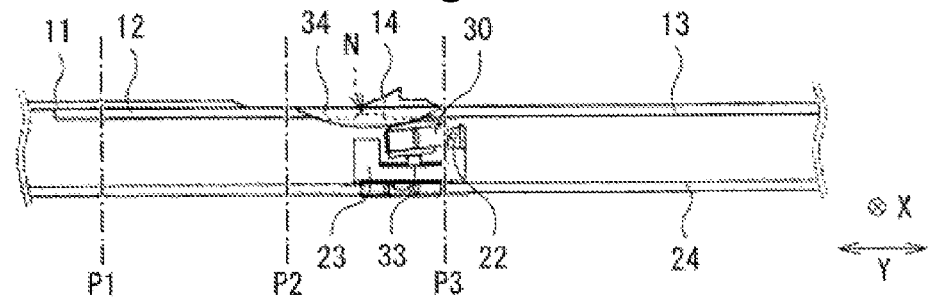
FIG. 15 is a drawing for explaining an operation of the image reading and forming apparatus following FIG. 14.

Subsequently, the pair of sliding members 30 moves to the downstream side while being contacted by the pair of protrusions 34. Thereby, as shown in FIG. 15, because the pair of sliding members 30 climbs over the pair of protrusions 34, the pair of sliding members 30 moves to the downstream side while gradually approaching the second image reading platform 13. In this case also, in a similar manner to the case shown in FIG. 14, the image reading element 22 moves to the downstream side while following the sliding operation of the pair of sliding members 30 mentioned above.

Figure 16:
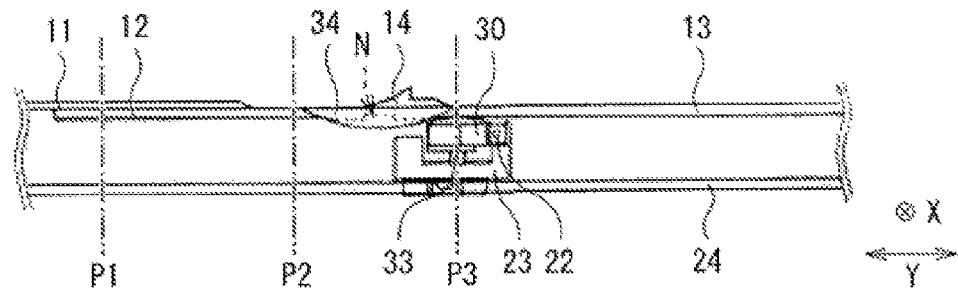
FIG. 16 is a drawing for explaining an operation of the image reading and forming apparatus following FIG. 15.

Subsequently, once the image reading element 22 reaches the reading start position P3, as shown in FIG. 16, the pair of sliding members 30 is contacted by the second image reading platform 13. Thereby, the image reading element 22 can read the image of the manuscript placed on the second image reading platform 13 as mentioned above.

Based on the above, in the process where the image reading element 22 moves from the reading position P2 to the reading start position P3, the pair of sliding members 30 bypasses the height difference N by utilizing the pair of protrusions 34 provided on the pair of sliding paths R.

Once the image reading operation using the second image reading platform 13 is complete, the image reading element 22 returns to the initial position P1 via the reading position P2 from the reading start position P3 for example. In this case, performed is the opposite operation to the sliding operation of the pair of sliding members 30 mentioned above, that is, the opposite operation to the operation that the pair of sliding members 30 bypasses the height difference N by utilizing the pair of protrusions 34 in the process where the image reading element 22 moves from the reading position P2 to the reading start position P3.

<2-2. Operations of the Image Forming Apparatus>

The image forming apparatus 200 operates in the following manner.

In this image forming apparatus 200, for example, an image is formed on the surface of the medium M by performing a development process, a primary transfer process, a secondary transfer process, and a fusing process in this order for example. Below, adopted as an example is a case of using the medium M contained in the tray 41.

[Development Process]

The medium M contained in the tray 41 is carried in the direction of an arrow F1 along the carrying path R1 by the carrying rollers 83 and 84. In this case, multiple media M contained in the tray 41 are taken out one by one by the forwarding roller 81.

In the development process, once the photosensitive drum having a charged surface rotates in the development device 60Y, because the surface of the photosensitive drum is irradiated with light by the LED head according to an image signal, an electrostatic latent image is formed on the surface of the photosensitive drum. Subsequently, because the yellow toner is supplied from the toner cartridge to the surface of the photosensitive drum, a yellow toner image is formed on the surface of the photosensitive drum.

[Primary Transfer Process]

In the transfer part 50, once the drive roller 52 rotates, the driven roller 53 and the backup roller 54 rotate according to the rotation of the drive roller 52. Thereby, the intermediate transfer belt 51 moves in the direction of an arrow F5.

In the primary transfer process, because the primary transfer roller 55Y is pressed against the photosensitive drum via the intermediate transfer belt 51, in the development process mentioned above, the yellow toner image formed on the surface of the photosensitive drum is transferred to the surface of the intermediate transfer belt 51.

Afterwards, the intermediate transfer belt 51, to which the yellow toner image was transferred, continues to move in the direction of the arrow F5. Thereby, in the development devices 60M, 60C, and 60K, and the primary transfer rollers 55M, 55C, and 55K, development processes and primary transfer processes are sequentially performed following the same procedure as in the development device 60Y and the primary transfer roller 55Y mentioned above. Thereby, toner images of the individual colors are sequentially transferred to the surface of the intermediate transfer belt 51.

That is, by the development device 60M and the primary transfer roller 55M, a magenta toner image is transferred to the surface of the intermediate transfer belt 51. Subsequently, by the development device 60C and the primary transfer 55C, a blue toner image is transferred to the surface of the intermediate transfer belt 51. Subsequently, by the development device 60K and the primary transfer roller 55K, a black toner image is transferred to the surface of the intermediate transfer belt 51.

Needless to say, whether the development processes and the transfer processes are actually performed in the development devices 60Y, 60M, 60C, and 60K, and the primary transfer rollers 55Y, 55M, 55C, and 55K is determined according to the kinds of necessary colors (toners) for forming the image.

[Secondary Transfer Process]

The medium M carried along the carrying path R1 passes between the backup roller 54 and the secondary transfer roller 56.

In the secondary transfer process, because the secondary transfer roller 56 is pressed against the backup roller 54 via the medium M, the toner images transferred to the surface of the intermediate transfer belt 51 in the primary transfer process mentioned above are transferred to the surface of the medium M.

[Fusing Process]

Because the medium M, to which the toner images are transferred in the secondary transfer process, continues to be carried in the direction of the arrow F1 along the carrying path R1, it is put into the fuser part 70.

In the fusing process, the heat application roller 71 is heated by a heater, and once the pressure application roller 72 rotates in a state where it is pressed against the heat application roller 71, the medium M is carried so as to pass between the heat application roller 71 and the pressure application roller 72.

Thereby, because the toner images transferred to the surface of the medium M are heated by the heat application roller 71, the toner images are melted. Also, the toner images in a molten state are pressed against the medium M by the pressure application roller 72, the toner images are fused to the surface of the medium M.

Because the medium M, to which the toner images are fused, is carried in the direction of an arrow F2 by the carrying roller 85 along the carrying path R2, it is forwarded to the stacker part 202.

Note that although not explained in detail here, for example, if images are formed on both sides of the medium M, the medium M that passed through the fuser part 70 is carried in the direction of arrows F3 and F4 by the carrying rollers 86-89 along the carrying paths R3-R5, and afterwards carried again in the direction of the arrow F1 by the carrying rollers 83 and 84 along the carrying path R1. In this case, the direction in which the medium M is carried is controlled by the carrying path switching guides 91 and 92. Thereby, on the back surface (the surface where no image is formed yet) of the medium M, the primary transfer process, the secondary transfer process, and the fusing process are performed again.

Also, in the same manner, although not explained in detail here, if images are formed on one surface of the medium M multiple times for example, the medium M that passed through the fuser part 70 is carried in the direction of the arrows F3 and F4 by the carrying rollers 86-88 along the carrying paths R3 and R5, and afterwards carried again in the direction of the arrow F1 by the carrying rollers 83 and 84 along the carrying path R1. In this case, the direction in which the medium M is carried is controlled by the carrying path switching guides 91 and 92. Thereby, on the front surface (the surface where an image is already formed) of the medium M, the primary transfer process, the secondary transfer process, and the fusing process are performed again.

<3. Action and Effect of the Image Reading and Forming Apparatus>

According to the image reading and forming apparatus of an embodiment of this invention, the following advantages are obtained.

<3-1. Action and Effect of this Invention>

According to the image reading and forming apparatus of this invention, the first mage reading platform 12 and the second image reading platform 13 are separated from each other via the separation member 14, and also the pair of sliding members 30 can slide on the pair of sliding paths R partially overlapping with the first image reading platform 12 and the second image reading platform 13 according to the movement of the image reading element 22. Also, provided on part of the pair of sliding paths R positioned outside the separation member 14 is the pair of protrusions 34 protruding more than the first image reading platform 12 and the second image reading platform 13 toward the pair of sliding members 30.

In this case, as explained referring to FIGS. 12-16, in the process where the image reading element 22 moves between the reading position P2 and the reading start position P3, the pair of sliding members 30 bypasses the height difference N by utilizing the pair of protrusions 34 provided on the pair of sliding paths R. Thereby, because the pair of sliding members 30 does not pass through the height difference N, the vibration of the pair of sliding members 30 due to the existence of the height difference N is suppressed. Therefore, because a decrease in image reading accuracy due to the vibration of the image reading element 22 is suppressed, an excellent image reading performance can be obtained.

Especially, concerning the shape of the protrusions 34, if the angles θ defined by the bottom faces 12S and 13S and the protruding faces 34S are smaller than 90° in the positions where the bottom faces 12S and 13S and the protruding faces 34S intersect, it becomes harder for the pair of sliding members 30 to vibrate, obtaining a higher effect. In this case, if the contour of the protruding faces 34S is in an arc shape and the width W of the protrusions 34 is greater than the height H, an even higher effect can be obtained.

Also, if each the pair of protrusions 34 is extended to positions partially overlapping with each of the first image reading platform 12 and the second image reading platform 13 in the Y direction, because it becomes harder for the pair of sliding members 30 to vibrate, a higher effect can be obtained.

Also, if the pair of protrusions 34 is fixed to the upper frame 11, even when the upper frame 11 warps downwards due to an external stress, the positional relation between the pair of protrusions 34 and the first image reading platform 12 and the second image reading platform 13 is maintained. Therefore, because it becomes harder for the pair of sliding members 30 to vibrate, a higher effect can be obtained. In this case, if the pair of protrusions 34 is integrated with the upper frame 11, an even higher effect can be obtained.

Also, if the pair of sliding members 30 is biased by the bias members 33 to the first image reading platform 12 and the second image reading platform 13, a higher effect can be obtained. To be detailed, if the pair of protrusions 34 is not utilized, in the case where the pair of sliding members 30 is biased to the first image reading platform 12 and the second image reading platform 13, in comparison with the case where the pair of sliding members 30 is not biased to the first image reading platform 12 and the second image reading platform 13, it becomes essentially easy for the pair of sliding members 30 to vibrate due to the existence of the height difference N. Therefore, in the case where the pair of sliding members 30 is biased to the first image reading platform 12 and the second image reading platform 13, by having the pair of sliding members 30 take a detour so as not to pass through the height difference N by utilizing the pair of protrusions 34, the pair of sliding members 30 can be more effectively prevented from vibrating.

<3-2. Comparison Between this Invention and the Reference Example>

In the image reading and forming apparatus of this invention, as explained below, even in comparison with an image reading and forming apparatus of the reference example, an advantage can be obtained. The configuration of the image reading and forming apparatus explained here corresponds to the configuration of an image reading device disclosed in the above-mentioned prior art (Laid-Open Japanese Patent Publication 2014-003396).

Figure 17:
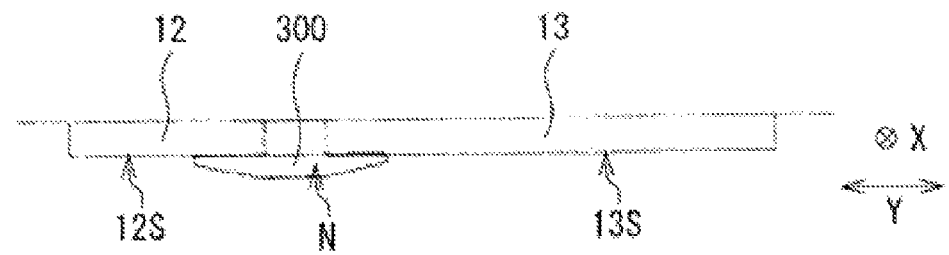
FIG. 17 is a cross-sectional view for explaining the configuration of an image reading and forming apparatus of a reference example.
Figure 18:
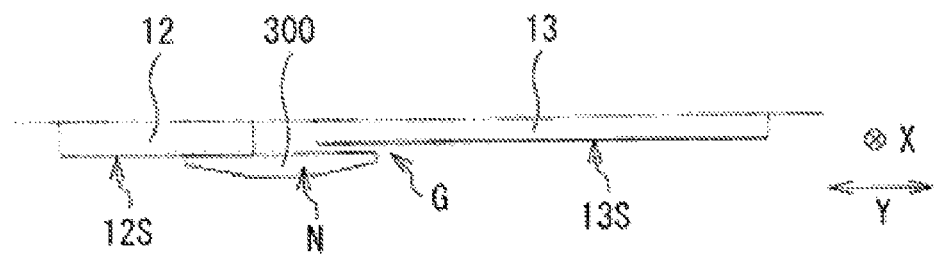
FIG. 18 is a cross-sectional view for explaining a problem of the image reading and forming apparatus of the reference example.
Figure 19:
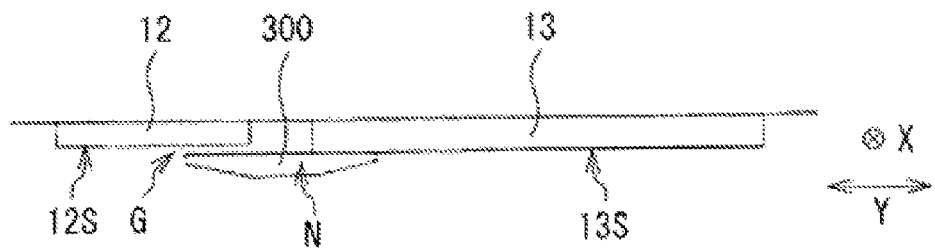
FIG. 19 is another cross-sectional view for explaining a problem of the image reading and forming apparatus of the reference example.

FIGS. 17-19 show the cross-sectional configuration corresponding to FIG. 9 for explaining the configuration and problems of the image reading and forming apparatus of the reference example. Note that in FIGS. 17-19, the same codes are given to the same components as the components in the image reading and forming apparatus of this invention, and only the major components among a series of components shown in FIG. 9 are shown. Also, as to the lower frame 21, the image reading element 22, and the pair of sliding members 30 explained below, FIGS. 5 and 9 are referred to at any time.

In the image reading and forming apparatus of the reference example, the first image reading platform 12 and the second image reading platform 13 are separated from each other, and the height difference N is formed between the first image reading platform 12 and the second image reading platform 13. In order to suppress the vibration of the pair of sliding members 30 during its sliding operation due to this height difference N, a bridge part 300 is utilized.

This bridge part 300 is provided below the first image reading platform 12 and the second image reading platform 13 so as to be in contact with the first image reading platform 12 and the second image reading platform 13. Also, the bridge part 300 is disposed on one of the siding paths R. The shape of the bridge part 300 is nearly an inverted trapezoid, and the bridge part 300 is fixed to the lower frame 21.

In the case where the image reading element 22 reciprocates between the position facing the first image reading platform 12 and the position facing the second image reading platform 13, the pair of sliding members 30 climbs over the bridge part 300. Thereby, because the pair of sliding members 30 bypasses the height difference N by utilizing the bridge part 300, the vibration of the pair of sliding members 30 due to the height difference N is suppressed.

In this case, as shown in FIG. 17, because the thickness of the first image reading platform 12 and the thickness of the second image reading platform 13 are the same, the bottom surface 12S of the first image reading platform 12 and the bottom surface 13S of the second image reading platform 13 should desirably be positioned at the same height. It is because the bridge part 300 is contacted by both the first image reading platform 12 and the second image reading platform 13.

However, if the thickness of the first image reading platform 12 and the thickness of the second image reading platform 13 are different due to an error at the time of formation or the like, because the position of the bottom surface 12S and the position of the bottom surface 13S shift in the height direction, after all, it becomes easy for the pair of sliding members 30 to vibrate.

To be detailed, in the case where the thickness of the first image reading platform 12 is greater than the thickness of the second image reading platform 13, as shown in FIG. 18, although the bridge part 300 is contacted by the first image reading platform 12, it is not contacted by the second image reading platform 13. Thereby, a gap G occurs between the bridge part 300 and the second image reading platform 13. In this case, when the pair of sliding members 30 climbs over the bridge part 300, the bridge part 300 warps so as to approach the second image reading platform 13 in the gap G, which makes it easy for the pair of sliding members 30 to vibrate due to the warp of the bridge part 300.

On the other hand, also in the case where the thickness of the first image reading platform 12 is smaller than the thickness of the second image reading platform 13, as shown in FIG. 19, a gap G occurs between the bridge part 300 and the first image reading platform 12. Therefore, when the pair of sliding members 30 climbs over the bridge part 300, it becomes easy for the pair of sliding parts 30 to vibrate due to the warp of the bridge part 300.

Based on these, in the image reading and forming apparatus of the reference example, although the vibration of the pair of sliding members 30 due to the existence of the height difference N is suppressed, because the vibration of the pair of sliding members 30 due to the existence of the gap G is not suppressed, no sufficient image reading performance can be obtained.

As opposed to this, in the image reading and forming apparatus of this invention, as shown in FIGS. 5 and 9, the pair of sliding paths R is provided outside the first image reading platform 12 and the second image reading platform 13, and the pair of protrusions 34 is disposed on the pair of sliding paths R.

In this case, as mentioned above, when the image reading element 22 reciprocates, the pair of sliding members 30 bypasses the height difference N by utilizing the pair of protrusions 34, thereby the vibration of the pair of sliding members 30 due to the height difference N is suppressed.

Furthermore, as shown in FIG. 5, seen from the upper side, the pair of protrusions 34 is disposed in positions that do not overlap with the first image reading platform 12 or the second image reading platform 13. Thereby, unlike the image reading and forming apparatus of the reference example mentioned above, even if the gap G occurs due to the difference between the thickness of the first image reading platform 12 and the thickness of the second image reading platform 13, the pair of sliding members 30 would not vibrate due to the existence of the gap G.

Based on these, in the image reading and forming apparatus of this invention, the vibration of the pair of sliding members 30 due to the height difference N is suppressed, and the vibration of the pair of sliding members 30 due to the gap G fundamentally does not occur. Therefore, a sufficient image reading performance can be obtained.

<4. Modification>

The configuration of the image reading and forming apparatus mentioned above can be modified as necessary.

FIGS. 20-24 show the configuration of the upper frame 11 and the configuration of the lower frame 21 for explaining a modification of the configuration of the image reading and forming apparatus.

Figure 20:
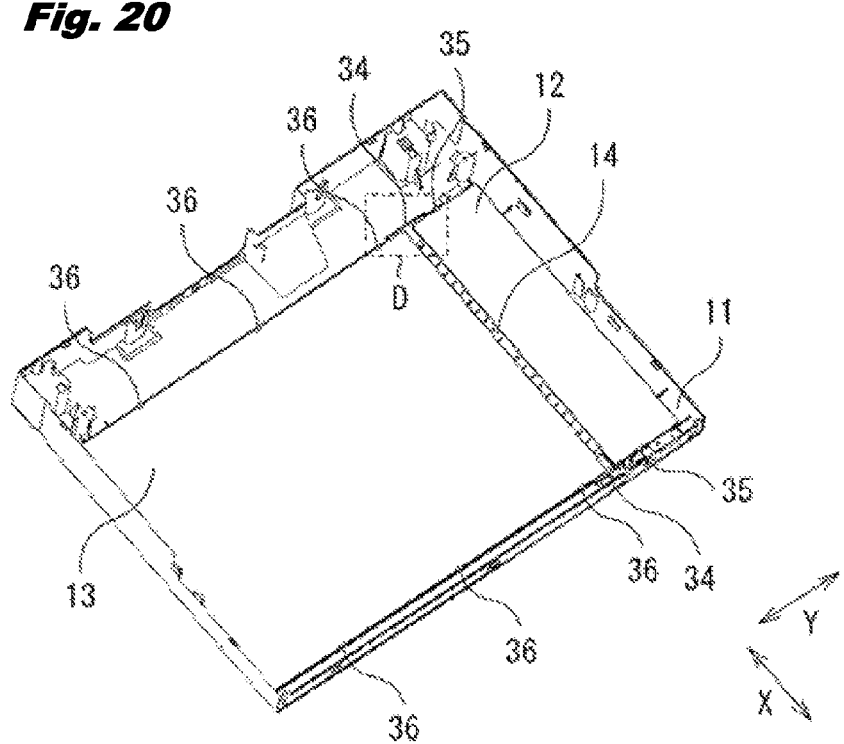
FIG. 20 is a perspective view for explaining a modification of the configuration of the upper frame.
Figure 21:
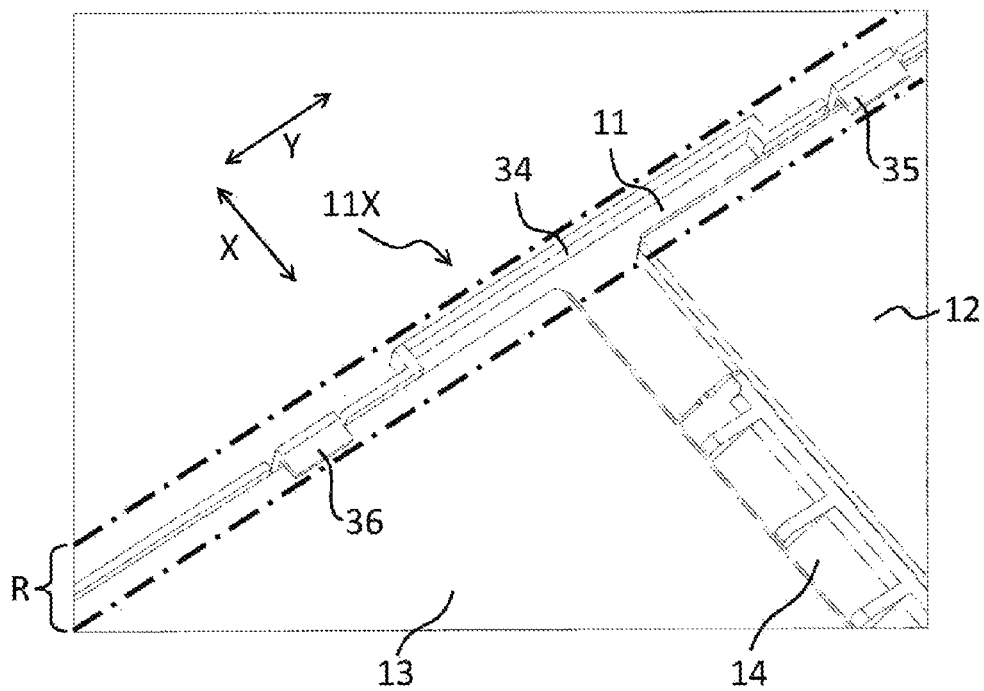
FIG. 21 is a perspective view showing enlarged part (part D) of the configuration of the upper frame shown in FIG. 20.
Figure 22:
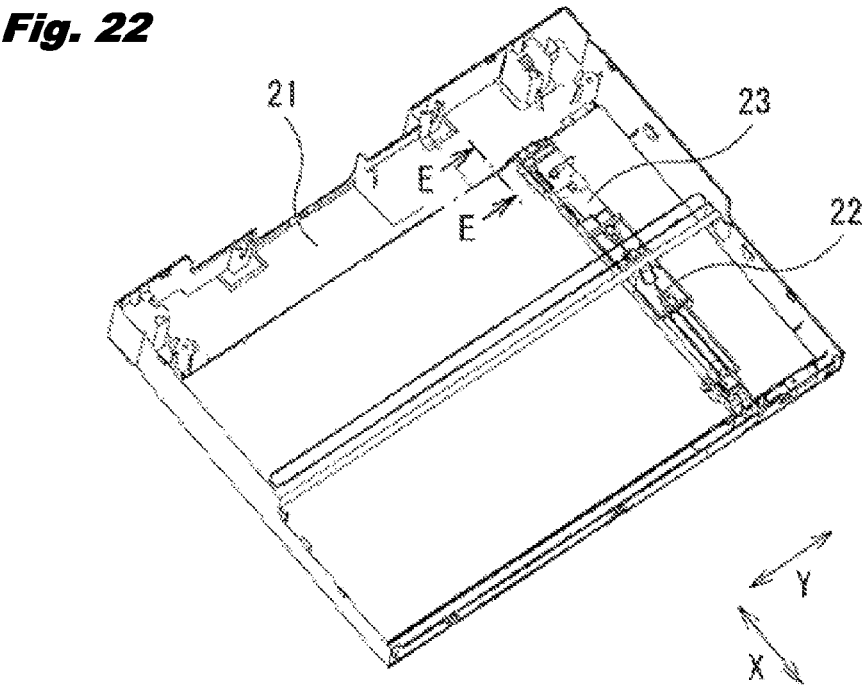
FIG. 22 is a perspective view for explaining a modification of the configuration of the lower frame.
Figure 23:
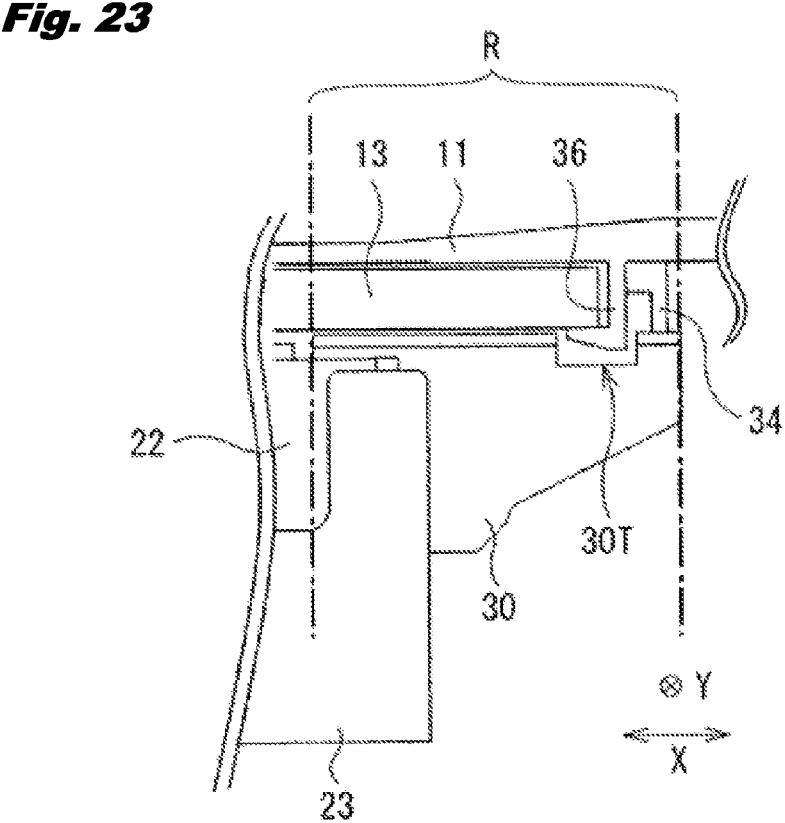
FIG. 23 is a cross-sectional view showing the configuration along a line E-E of the lower frame shown in FIG. 22.
Figure 24:
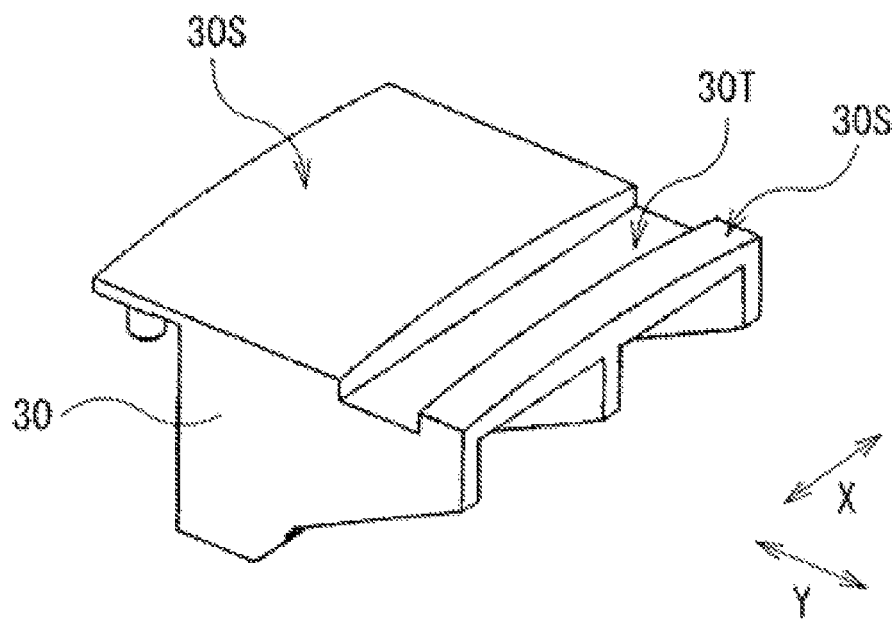
FIG. 24 is a perspective view showing the enlarged configuration of a sliding member shown in FIG. 23.

FIG. 20 shows the perspective-view configuration of the upper frame 11 seen from the upper side. FIG. 21 shows enlarged part (part D) of the perspective-view configuration of the upper frame 11 shown in FIG. 20. FIG. 22 shows the perspective-view configuration of the lower frame 21 seen from the upper side. FIG. 23 shows the cross-sectional configuration along a line E-E of the lower frame 21 shown in FIG. 22. FIG. 24 shows the enlarged perspective-view configuration of the sliding member 30 shown in FIG. 23. Note that shown in FIG. 23 is a state where the upper frame 11 and the lower frame 21 are combined with each other.

The upper frame 11 comprises, as shown in FIG. 20 for example, latches 35 that hold the first image reading platform 12 and latches 36 that hold the second image reading platform 13.

The reason why the upper frame 11 comprises the latches 35 is that the first image reading platform 12 is physically held utilizing the latches 35. Thereby, it becomes hard for the first image reading platform 12 to be inclined, and it also becomes hard for the first image reading platform 12 to drop out from the upper frame 11.

To be detailed, in the case where the upper frame 11 does not comprise the latches 35, as mentioned above for example, the first image reading platform 12 is attached to the bottom surface of the upper frame 11 via an adhesive member such as a double-sided tape. In this case, because the first image reading platform 12 is chemically attached to the upper frame 11 by utilizing the adhesive member, if the adhesive power of the adhesive member deteriorates due to degradation over time, water absorption, and the like, there is a possibility that the first image reading platform 12 may be unintentionally inclined, and there is also a possibility that the first image reading platform 12 may unintentionally drop out from the upper frame 11.

As opposed to this, in the case where the upper frame 11 comprises the latches 35, the first image reading platform 12 is physically attached to the upper frame 11 by utilizing the latches 35. In this case, unless the latches 35 are damaged due to a strong shock or the like received by the upper frame 11, the possibility that the first image reading platform 12 may be unintentionally inclined decreases, and the possibility that the first image reading platform 12 may unintentionally drop out from the upper frame 11 also decreases.

Note that the advantages obtained in the case where the first image reading platform 12 is held by utilizing the above-mentioned latches 35 can also be obtained in the same manner in the case where the second image reading platform 13 is held by utilizing the latches 36.

The latches 35 are holding parts (fasteners) protruding downward of the upper frame 11, that is, toward the first image reading platform 12. These latches 35 have a shape, for example, that protrudes downward of the upper frame 11 and afterwards bends in the middle for embracing the first image reading platform 12. Note that the latches 35 are formed of a similar plastic material to that of the upper frame 11 for example.

Although the number of the latches 35 is not particularly limited as far as it is one or two or larger, above all, it should desirably be two or larger because it will make it easy to hold the first image reading platform 12 stably by utilizing the latches 35.

Although the positions of the latches 35 are not particularly limited, above all, if the number of the latches 35 is two or larger, those two or more latches 35 should desirably be disposed facing each other via the first image reading platform 12 because it becomes easy to hold the first image reading platform 12 stably by utilizing the latches 35.

Note that shown in FIG. 20 is a case where the number of the latches 35 is two, and one latch 35 is disposed facing another latch 35 via the first image reading platform 12.

Note that the latches 36 are similar holding parts to the above-mentioned latches 35 and have the same configuration as the latches 35 except for holding the second image reading platform 13. Note that shown in FIG. 20 is a case where the number of the latches 36 is six, and three latches 36 are disposed facing the other three latches 36 via the second image reading platform 13.

Accompanying this, as shown in FIGS. 21-23 for example, the positions of the pair of protrusions 34 are shifted to the outside of the latches 35 and 36 so as not to overlap with the formation positions of the latches 35 and 36 in the Y direction.

To be detailed, the upper frame 11 comprises a pair of extended parts 11X that is partially extended to the outside in the vicinity of the separation member 14. This pair of extended parts 11X is disposed on the pair of sliding paths R, and each of the pair of protrusions 34 is disposed in a position corresponding to each of the pair of extended parts 11X. Shown in FIG. 21 for example is a case where the pair of protrusions 34 is integrated with the pair of extended parts 11X.

Also, as shown in FIGS. 23 and 24 for example, each of the pair of sliding members 30 comprises a groove 30T in a position corresponding to the latches 35 and 36 (positions overlapping with the latches 35 and 36) so as not to collide with the latches 35 and 36. The depth of this groove 30T can be arbitrarily set according to such conditions as the protrusion lengths of the latches 35 and 36.

Thereby, as explained referring to FIGS. 12-16, when the pair of sliding members 30 slides on the pair of sliding paths R according to the reciprocating movement of the image reading element 22, the pair of sliding members 30 slides while climbing over the pair of protrusions 34, and the latches 35 and 36 also pass through the groove 30T.

Based on these, by utilizing the upper frame 11 provided with the latches 35 and 36, the pair of protrusions 34 is disposed on the extended parts 11X of the upper frame 11, and also the pair of sliding members 30 is provided with the groove 30T in the position overlapping with the latches 35 and 36. Thereby, the first image reading platform 12 and the second image reading platform 13 can be physically held by utilizing the latches 35 and 36 without obstructing the sliding (detour) operation of the pair of sliding members 30 utilizing the pair of protrusions 34.

Although this invention was explained above using an embodiment, this invention is not limited to the mode explained in the above-mentioned embodiment, but various modifications are possible.

For example, the image reading device of this invention may be used as it is without being combined with an image forming apparatus. Also, for example, the image forming system of the image reading and forming apparatus, to which the image reading device is applied, is not limited to the intermediate transfer system using an intermediate transfer belt but can be another image forming system.

What is claimed is:

1. An image reading device, comprising:
   a first image reading platform and a second image reading platform arranged in a first direction and separated from each other with a separation member;
   an image reading element and a carriage equipped with a pair of sliding members, the image reading element and the carriage being movable between a first position facing the first image reading platform and a second position facing the second image reading platform; and
   a pair of protrusions that is arranged to correspond to the pair of sliding members and that contacts the pair of sliding members while the carriage moves from the first position to the second position, wherein
   the pair of protrusions extend from the first image reading platform to the second image reading platform in the first direction, and
   the pair of protrusions protrudes further toward the image reading element beyond a bottom surface of the first image reading platform, a bottom surface of the second image reading platform and a bottom surface of the separation member.

2. The image reading device according to claim 1, wherein
   at positions where a surface of each of the first image reading platform and the second image reading platform facing the image reading element intersects with a protruding surface of each of the pair of protrusions, an angle defined by the surface and the protruding surface is smaller than 90°.

3. The image reading device according to claim 1, wherein
   the contour of the protruding surface of each of the pair of protrusions is in an arc shape.

4. The image reading device according to claim 1, wherein
   a width of each of the pair of protrusions is greater than a height of the each of the pair of protrusions.

5. The image reading device according to claim 1, wherein
   each of the pair of protrusions extends to positions overlapping partially with the first image reading platform and the second image reading platform in the first direction.

6. The image reading device according to claim 1, further comprising:
   a supporting member that supports the first image reading platform and the second image reading platform, wherein
   the pair of protrusions is fixed to the supporting member.

7. The image reading device according to claim 6, wherein
   the pair of protrusions is integrated with the supporting member.

8. The image reading device according to claim 1, further comprising:
   a bias member that bias the pair of sliding members to the first image reading platform and the second image reading platform.

9. The image reading device according to claim 1, further comprising:
   a supporting member that supports the first image reading platform and the second image reading platform, wherein
   the supporting member comprises holding parts that protrude toward the first image reading platform and the second image reading platform and that support the first image reading platform and the second image reading platform,
   the pair of protrusions is provided on both sides of the holding parts in a second direction that intersects with the first direction, and
   each of the pair of sliding members comprises a groove at a position corresponding to the holding parts.

10. An image reading and forming apparatus, comprising:
    the image reading device according to claim 1, and
    an image forming apparatus that forms an image based on the image read by the image reading device.

* * * * *